United States Patent
Kawano

(10) Patent No.: US 10,754,590 B2
(45) Date of Patent: Aug. 25, 2020

(54) ELECTRONIC DEVICE AND DISPLAY CONTROL PROGRAM

(71) Applicant: SEIKO EPSON CORPORATION, Tokyo (JP)

(72) Inventor: Yo Kawano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/521,634

(22) Filed: Jul. 25, 2019

(65) Prior Publication Data

US 2020/0034084 A1    Jan. 30, 2020

(30) Foreign Application Priority Data

Jul. 27, 2018   (JP) ................................. 2018-141036

(51) Int. Cl.
*G06F 8/61*    (2018.01)
*G06F 3/12*    (2006.01)

(52) U.S. Cl.
CPC .......... *G06F 3/1204* (2013.01); *G06F 3/1255* (2013.01)

(58) Field of Classification Search
CPC combination set(s) only.
See application file for complete search history.

(56) References Cited

U.S. PATENT DOCUMENTS

| 9,841,936 | B2 | 12/2017 | Sakuraba | |
| 2016/0188273 | A1* | 6/2016 | Mochizuki | G06F 3/1205 358/1.15 |
| 2016/0306597 | A1* | 10/2016 | Sakuraba | G06F 3/1255 |
| 2018/0350325 | A1* | 12/2018 | Owari | G09G 5/363 |
| 2019/0124218 | A1* | 4/2019 | Narita | H04N 1/00482 |

FOREIGN PATENT DOCUMENTS

JP    2016-206827 A    12/2016

* cited by examiner

*Primary Examiner* — Helen Zong
(74) *Attorney, Agent, or Firm* — Global IP Counselors, LLP

(57) ABSTRACT

Provided is technology improving user convenience when changing a setting in an electronic device. An electronic device has: an evaluator module configured to determine whether or not a setting value a user set for a first setting item contained in a first settings screen matches a setting value of a second setting item that is already set; an adding module configured to add to the first settings screen, when the setting does not match, a shortcut operator that calls a second settings screen including the second setting item; and an operation reception processor configured to call, when the setting matches, the second settings screen from the first settings screen when operation of a first operator that is different from the shortcut operator is received.

6 Claims, 19 Drawing Sheets

ELECTRONIC DEVICE AND DISPLAY CONTROL PROGRAM

BACKGROUND

1. Technical Field

The present invention relates to an electronic device and a display control program.

This application is based upon Japanese Patent Application 2018-141036 filed on Jul. 27, 2018, the entire contents of which are incorporated by reference herein.

2. Related Art

Methods of automatically changing settings to eliminate conflicts when there are conflicting settings in printers and multifunction devices are known from the literature. JP-A-2016-206827, for example, describes highlighting what changed in both conflicting settings after automatically changing a setting.

User convenience can be improved if, when setting items that conflict are displayed inn different screens (windows), the location of the setting item on the other screen can be easily accessed.

SUMMARY

An objective of the present invention is to improve user convenience and ease of use when a setting is changed on an electronic device.

To achieve the foregoing objective, an electronic device according to aspect of the invention has: an evaluator module configured to determine whether or not a setting value a user set for a first setting item contained in a first settings screen matches a setting value of a second setting item that is already set; an adding module configured to add to the first settings screen, when the setting does not match, a shortcut operator that calls a second settings screen including the second setting item; and an operation reception processor configured to call, when the setting matches, the second settings screen from the first settings screen when operation of a first operator that is different from the shortcut operator is received.

Note that herein the setting value of the first setting item and the setting value of the second setting item matching means that a target process can be executed when operation is configured based on the setting value of the first setting item and the setting value of the second setting item; and the setting value of the first setting item and the setting value of the second setting item not matching or being a mismatch means that the target process cannot be executed, or executing the target process is prohibited, when operation is configured based on the setting value of the first setting item and the setting value of the second setting item, and at least one of the setting values must be changed to execute the target process.

More specifically, when a setting value of a second setting item that is already set, and the setting value of the first setting item that is set after the second setting item do not match, a shortcut operator that calls a second settings screen including a second setting item is added to the first settings screen. The shortcut operator is an operator that can indirectly call the second settings screen. Therefore, by operating the newly added shortcut operator, the user can easily display the second settings screen, and can confirm or change the setting value of the second setting item. As a result, user convenience and ease of use can be improved when changing settings on an electronic device.

Note that the second settings screen can also be displayed and the setting value of the second setting item can be checked or changed by operating the first operator when the setting value of the second setting item and the setting value of the first setting item match.

In an electronic device according to another aspect of the invention, the second settings screen is a dedicated screen enabling setting the second setting item.

This configuration enables the user to more easily find the second setting item in the second settings screen than in a configuration in which setting items other than the second setting item are also contained in the second settings screen.

In an electronic device according to another aspect of the invention, the first operator may be configured as an operator that calls the second settings screen indirectly from the first settings screen.

This configuration enables the user to display a separate screen by operating the first operator in the first settings screen. When an operating calling the second settings screen is executed in the separate screen, the second settings screen can be displayed. Therefore, the second settings screen can be displayed through a separate screen accessed from the first settings screen as a result of operating the first operator.

In an electronic device according to another aspect of the invention, the adding module adds the shortcut operator in a first format that indicates a mismatch is not resolved when the setting value of the first setting item and the setting value of the second setting item do not match, and the setting value of the second setting item was not automatically changed to resolve the mismatch; and adds the shortcut operator in a second format that is different from the first format when the setting value of the first setting item and the setting value of the second setting item do not match, and the setting value of the second setting item was automatically changed to resolve the mismatch.

This configuration can make the user aware of when a setting value is automatically changed and is not automatically changed to resolve a mismatch between the setting value of a second setting item and the setting value of a first setting item.

In an electronic device according to another aspect of the invention, the adding module removes the shortcut operator in the first format from the first settings screen when a first condition is satisfied, and removes the shortcut operator in the second format from the first settings screen when a second condition is satisfied; and the first condition and the second condition are different conditions.

This configuration can remove from the first settings screen a shortcut operator displayed in a first format in response to a first condition (that differs from a second condition) that is a condition for cancelling display of a shortcut operator in a first format being met. This configuration can also remove from the first settings screen a shortcut operator displayed in a second format in response to a second condition (that differs from the first condition) that is a condition for cancelling display of a shortcut operator in a second format being met. Shortcut operators in the first format and shortcut operators in the second format can therefore be removed from the first settings screen at respectively appropriate times.

Another aspect of the invention is a display control program causing a computer to function as: an evaluator module configured to determine whether or not a setting value a user set for a first setting item contained in a first settings screen matches a setting value of a second setting item that is already set; an adding module configured to add to the first settings screen, when the setting does not match, a shortcut operator that calls a second settings screen including the second setting item; and an operation reception processor configured to call, when the setting matches, the second settings screen from the first settings screen when operation of a first operator that is different from the shortcut operator is received.

This display control program enables the user to easily display a second settings screen by operating a newly added shortcut operator, and confirm or change the setting value of the second setting item. As a result, user convenience and ease of use can be improved when changing settings on an electronic device.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the invention are described below in the following order.
(1) Embodiment 1
(1-1) Configuration of a multifunction device
(1-2) Example 1
(1-3) Example 2
(2) Embodiment 2
(2-1) Example 3
(2-2) Example 4
(3) Other embodiments (1) Embodiment 1

(1-1) Configuration of a Multifunction Device

Figure 1:
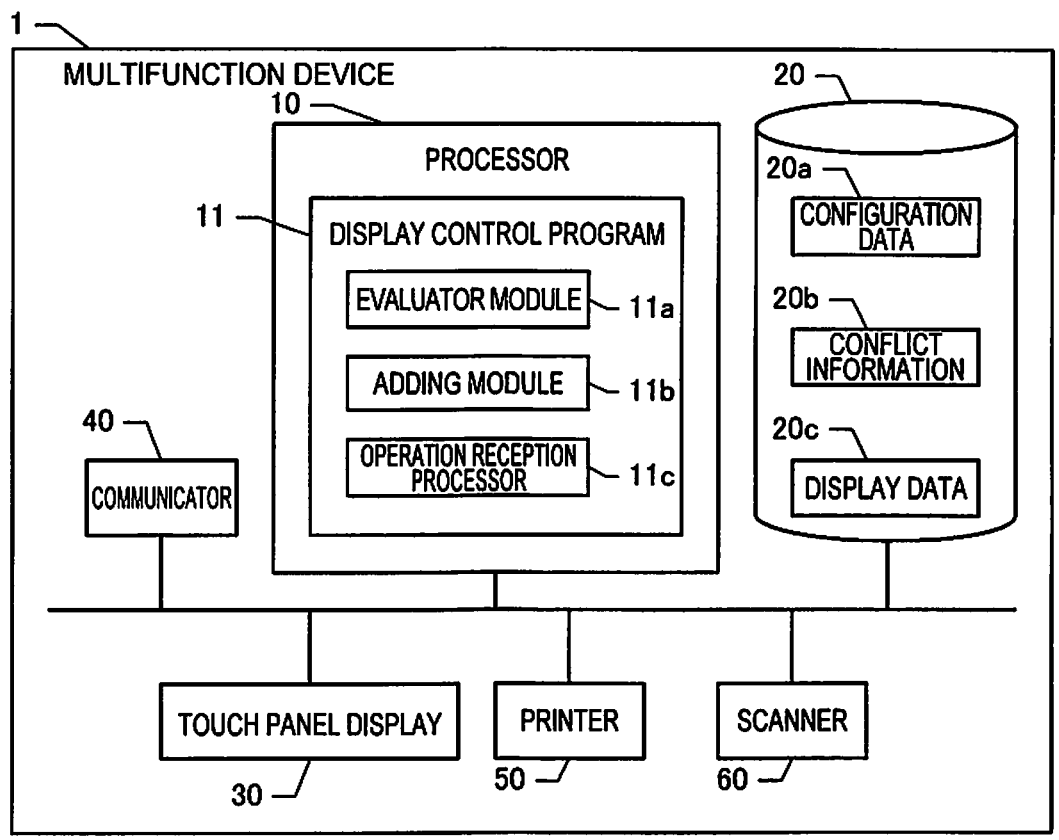
FIG. 1 is a block diagram illustrating the configuration of an multifunction device.

FIG. 1 is a block diagram illustrating the configuration of a multifunction device 1 as an example of an electronic device according to a preferred embodiment of the invention.

The multifunction device 1 has a processor 10, nonvolatile memory 20, a touch panel display 30, a communicator 40, a printer 50, and a scanner 60. The processor 10

The processor 10 includes devices such as a CPU, ROM, and RAM not shown, and controls parts of the multifunction device 1 by executing programs stored in nonvolatile memory 20.

The touch panel display 30 has a display panel with a touch panel overlaid on the display panel. The touch panel display 30 displays information on the display panel as controlled by the processor 10. The touch panel display 30 also has a sensing mechanism for detecting contact (referred to below as touches) on the touch panel by the user's finger or a stylus, and outputs the touch position to the processor 10. The processor 10 can acquire the content of the user operations on the touch panel display 30 based on the information acquired from the sensing mechanism, and can execute processes corresponding to the content of the operation.

The communicator 40 includes removable memory that is installed to the multifunction device 1, and an interface circuit for communicating with devices connected to the multifunction device 1 by wire or wirelessly.

The processor 10 can also acquire files recorded on devices connected through the communicator 40 as objects to print. The communicator 40 can also send and receive fax documents with external devices through the interface circuit.

The printer 50 has actuators, sensors, drive circuits, and mechanical parts for printing on various types of print media by known printing methods such as inkjet printing and electrophotographic printing. In this embodiment of the invention the printer 50 can store documents (media) on each of multiple trays. The printer 50 has a conveyance mechanism for selecting documents stored in the trays one by one, conveying the document through a conveyance path, and discharging the document printed during the conveyance process. Note that in this example a document that the printer 50 selects from a tray and prints is referred to as the output document, and the size is referred to as the output document size.

The scanner 60 includes devices known from the literature for scanning documents, such as a color image sensor and light source, an actuator and drive circuits for conveying documents, a sensor for detecting the size of the document, and other mechanical parts.

The scanner 60 also has a conveyance mechanism for picking documents set on a document tray one by one, conveying the document through the conveyance path, and discharging the document after scanning by illuminating the document with light from a light source. Note that in this embodiment the scanner 60 can scan one or both sides of a document.

In this embodiment the document set on the document tray of the scanner 60 is referred to as the set document, and the size of the set document as the set document size.

The processor 10 in this embodiment can control the scanner 60 to scan a document set on the document platen of the scanner 60, and can control the printer 50 to print the scanned image on the output document. In other words, the multifunction device 1 has a photocopy function. This means that the printer 50, scanner 60, and processor 10 can be said to configure a photocopier. The multifunction device 1 can also embody functions other than a copier function, but the embodiment described herein primarily focuses on the copier function.

Configuration data 20*a*, conflict information 20*b*, display data 20*c*, and programs not shown that are executed by the processor 10 are stored in the nonvolatile memory 20.

The configuration data 20*a* is data indicating settings for executing processes in the multifunction device 1. In the case of the copier function in this embodiment, the settings include, for example, the color of the recording material recorded on the output document, the print density, type of image, output document, printing surface, page layout, binding position, detailed print quality adjustments, copy ratio, binding margin, shadow removal, punch hole removal, and ID card copying.

The color of the recording material can be set to either monochrome or color.

A numeric value (such as a value indicating a value (%) relative to a reference) indicating the density of the recording material can be set as the print density.

The type of image can be set to text only, a combination of text and photograph, or photograph only.

The type of the output document (the size such as A4, A3, B4, or B5, and the type of paper, such as plain paper or photographic paper) of the output document can be set as the output document.

Because the output documents are stacked in a tray in this embodiment, and selection of a tray and selection of the output document have the same meaning in this embodiment, the output document settings may be the settings of the tray.

Whether to print the images of the front and back of the set document to the front or back of the output document can be set as the printing surface. For example, whether to print from one side to one side, or to print from one side to both sides can be set.

Page layout enables setting how many pages should be printed together on one side of the document (images of how many pages to print together on one side of the output document). For example, whether to use the normal setting printing an image of one page on one side of the output document (that is, n-up page layout turned off), or whether to set a n-in-1 layout to print images of n set documents (where n is an integer of two or more) on one page of the output document, can be selected.

The binding position enables setting where pages will be bound when printing a multiple page document. For example, the top left, left, top, or bottom left can be set as the binding position.

The detailed print quality settings include, for example, contrast, brightness, color correction, sharpness, hue adjustment, background deletion, and other items related to the print quality.

A value indicating the magnification for scaling the image can be set as the copy ratio. The copy ratio may be set to any desired value or a fixed value, and in this embodiment of the invention can be set to the Same Size (copy ratio=100%), automatic (output document size or set document size), or a fixed ratio for enlarging or reducing from a fixed document size. The fixed document sizes are document sizes that are determined according to a specific standard, and in this embodiment are set to A4, A3, B4, B5, for example. Therefore, examples of fixed ratios for scaling from a fixed document size include reduction from A3 to A4 (70%), and enlarging from B5 to B4 (141%).

The binding margin setting enables turning the binding margin function on or off. When the binding margin function is on, the binding position and binding width, for example, can be set when duplex (double side) printing is selected.

The shadow removal setting enables turning the shadow removal function on or off. When the shadow removal function is turned on, the location of the shadows to remove, for example, can be set.

The punch hole removal setting enables turning the punch hole removal function on or off. When the punch hole removal function is turned on, the location of the punch holes to remove, for example, can be set.

The ID card copy setting enables turning the ID card copy function on or off. The ID card copy function is a function for scanning both sides of documents such as driver licenses, health insurance cards, business cards, and copying the captured images arranged on one side of the output document. When the ID card copy function is turned on, whether the document (card) is set in the top aligned or left aligned position can be set.

Various options (settings) can obviously also be set automatically. In this case, the settings are made based on default values or on information (such as the set document size) detected by sensors in the multifunction device 1.

The configuration data 20*a* is data correlated to the value (set value) indicating, for each of the available settings such as described above, the current setting of the currently selected setting. More specifically, a value is related to each setting, and the configuration data 20*a* is defined and recorded in nonvolatile memory 20 by relating the value of the currently selected setting to the selected setting item.

The conflict information 20*b* is information for identifying combinations of setting values that do not match (are conflicting) between two or more setting items. For example, whether or not the setting value of a setting item that can be set as a second setting item matches (does not conflict with) or does not match (conflicts with) the setting value of a setting item that is possible as a first setting item is defined. For each setting value of a setting item that is possible as a first setting item, only the setting values of the setting items that are possible for a second setting item that matches may be defined; or for each setting value of a setting item that is possible as a first setting item, only the setting values of the setting items that are possible for a second setting item that do not match may be defined.

Automatic change information indicating whether a combination defined as a mismatch (conflicting) is a first pattern for which the setting value of the second setting item is not automatically changed, or a second pattern for which the setting value of the second setting item is automatically changed, is defined in the conflict information 20*b* as described below.

In the case of the second pattern, the setting value after automatically changing a second setting item (a setting value that does not conflict with the setting value of the first setting item) is defined in the conflict information 20*b*.

However, if the device can execute only one of the first pattern and second pattern, defining the automatic change information is not necessary. Defining the automatic change information is also not necessary if the device can only execute the first pattern.

The display data 20c is data identifying the images of objects (for example, operators such as icons and buttons, or text) configuring the screens presented on the touch panel display 30. The processor 10 can construct and display on the touch panel display 30 screens containing various objects using the display data 20c.

The user in this embodiment of the invention can configure a copy job using the screens presented on the touch panel display 30. The user can also select and set various options for each of multiple setting items. However, if all settings that can be selected for each option (setting item) are displayed in a single screen at once, either a large display area is required or the icons representing the selectable options must be very small.

The processor 10 in this embodiment of the invention displays only part of the selectable setting options for each of the multiple setting items in the basic settings screen (an example of a first settings screen), which is the screen that is displayed first as a screen for configuring settings. Selection options that are not displayed in the basic settings screen are configured to be set in configuration screens specific to those setting items. The settings screen specific to a particular setting item can be called from the basic settings screen.

Figure 4:
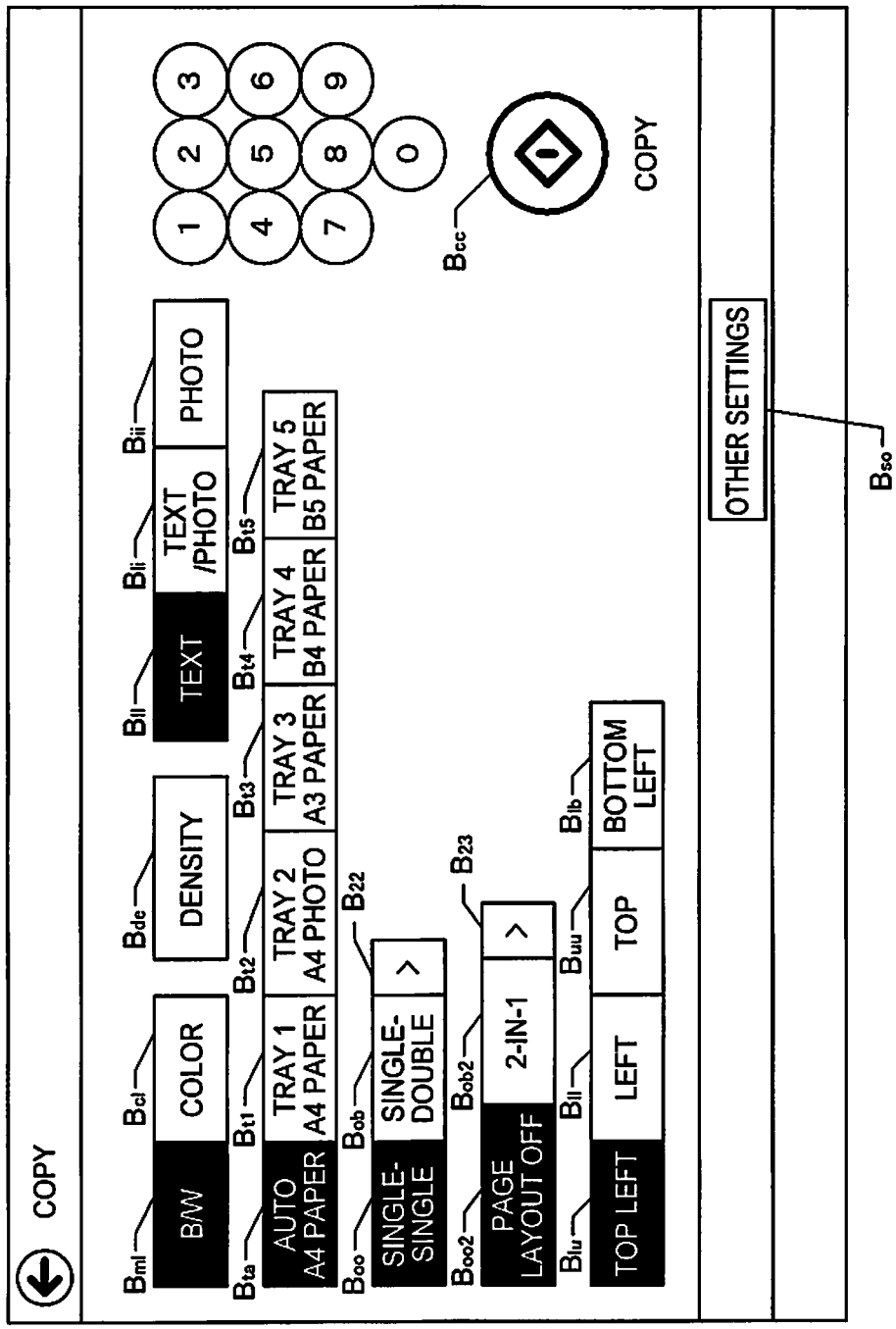
FIG. 4 shows an example of a basic settings screen in a first embodiment of the invention.

FIG. 4 shows an example of a basic settings screen for the copier function in the first embodiment of the invention. As shown in FIG. 4, the following setting items are included in the basic settings screen in this embodiment. More specifically, included are the color of the recording material recorded on the output document (as options, buttons $B_{m1}$, $B_{c1}$), the print density (button $B_{de}$ for calling the print density setting screen), the type of image (as options, buttons $B_{11}$, $B_{1i}$, $B_{ii}$), the output document (as options, buttons $B_{ta}$, $B_{t1}$, $B_{t2}$, $B_{t3}$, $B_{t4}$, $B_{t5}$), the printing surface (as options, buttons $B_{oo}$, $B_{ob}$ and other options button $B_{22}$), page layout page layout (as options, buttons $B_{oo2}$, $B_{ob2}$, and other options button $B_{23}$), and the binding position (as options, buttons $B_{1u}$, $B_{11}$, $B_{uu}$, $B_{1b}$).

The types of setting items included in the basic settings screen may be combinations other than described above. The items may also be customized by the user.

Other setting items not included in the basic settings screen can also be set in another settings screen, or set in a dedicated settings screen that can be called through another settings screen for setting other items. The Other Settings screen can be called by operating the Other Settings button $B_{so}$ (see FIG. 4) in the basic settings screen.

Figure 5:
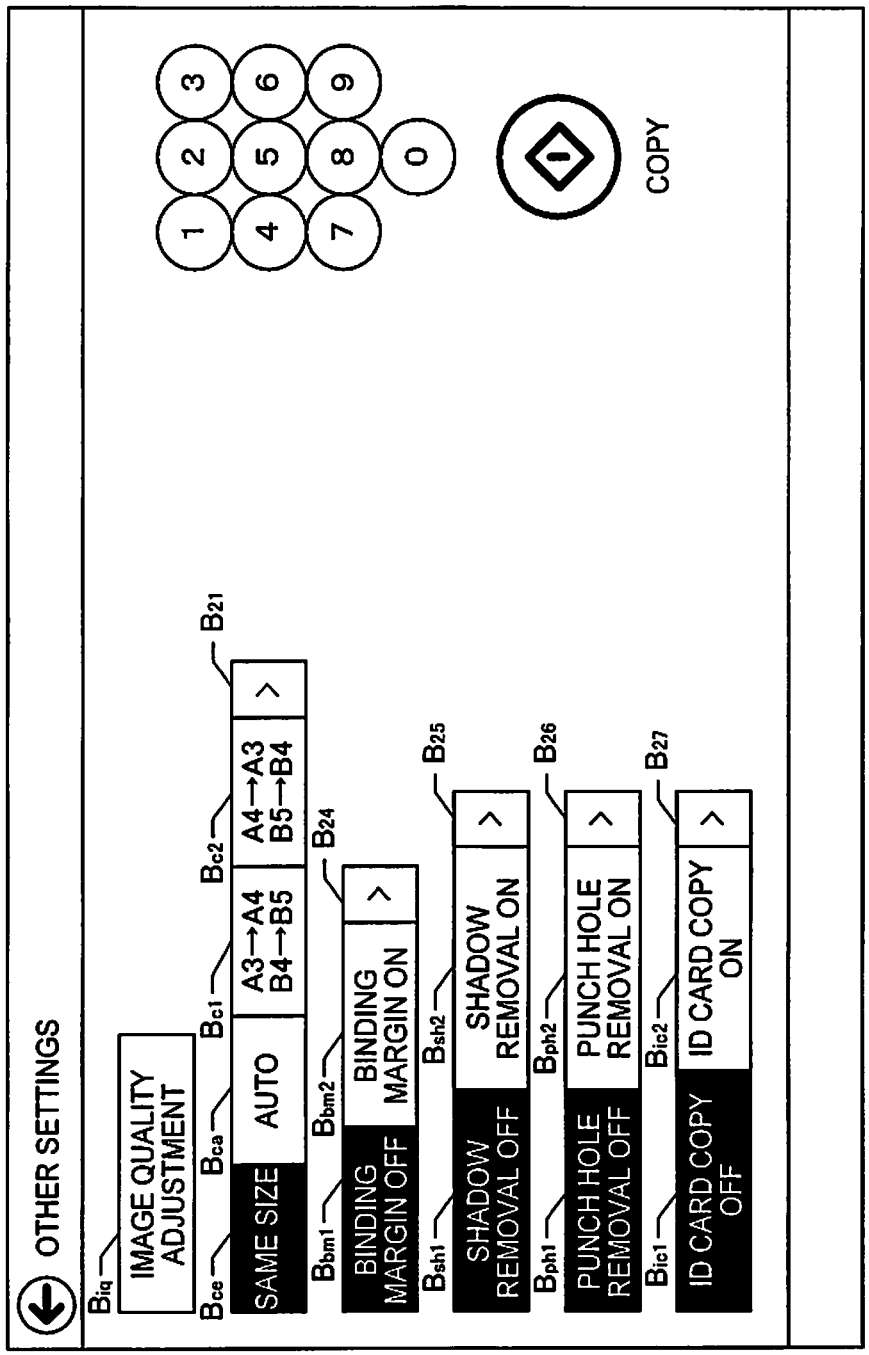
FIG. 5 shows an example of another settings screen in the first embodiment of the invention.

FIG. 5 shows an example of an Other Settings screen for the copier function. In this embodiment, as shown in FIG. 5, the following setting items are included in this Other Settings screen. Specifically, image quality adjustment (button $B_{iq}$ for calling the image quality adjustment screen), copy ratio (as options, buttons $B_{ce}$, $B_{ca}$, $B_{c1}$, $B_{c2}$, and other options button $B_{21}$), (as options, buttons $B_{bm1}$, $B_{bm2}$, and other options button $B_{24}$), shadow removal (as options, buttons $B_{sh1}$, $B_{sh2}$, and other options button $B_{25}$), punch hole removal (as options, buttons $B_{ph1}$, $B_{ph2}$, and other options button $B_{26}$), and ID card copy (as options, buttons $B_{ic1}$, $B_{ic2}$, and other options button $B_{27}$) are included.

Note that these are one example only, and various formats including other setting items are possible.

Figure 6:
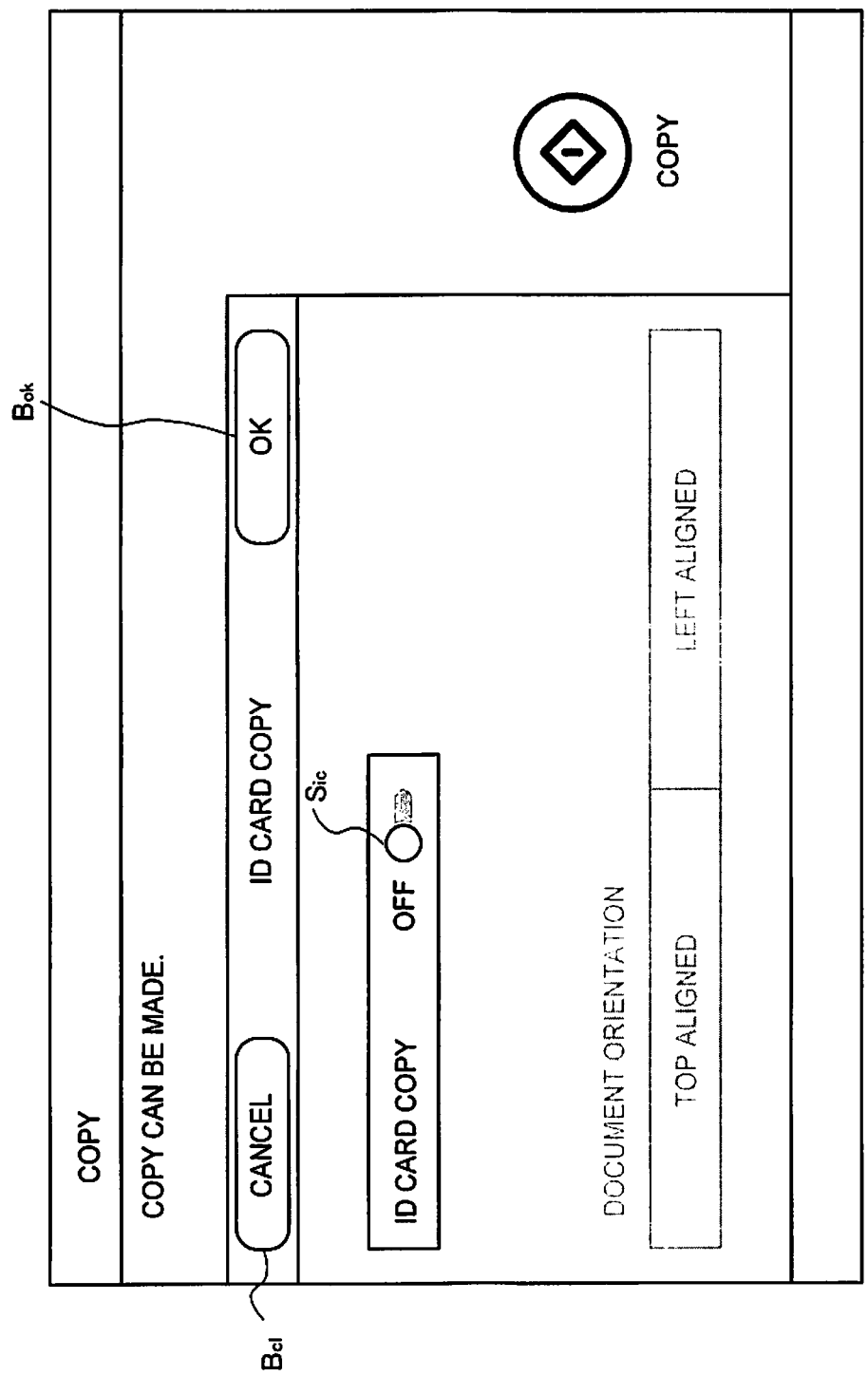
FIG. 6 shows a screen for copying an ID card.

As shown in FIG. 4 and FIG. 5, the other options buttons $B_{21}$, $B_{22}$, $B_{23}$, $B_{24}$, $B_{25}$, $B_{26}$, $B_{27}$ are operators for calling settings screens specific to the setting items associated with the specific other options button. For example, when other options button $B_{27}$ is operated to make an ID card copy as shown in FIG. 5, the screen changes to a dedicated configuration screen (ID card copy settings screen) for the ID card copy function as shown in FIG. 6. In the ID card copy settings screen the user can turn the ID card copy function on or off, and when the ID card copy function is on, can set the orientation of the set document to top aligned or left aligned.

The processor 10 (equivalent to a computer) controls parts of the multifunction device 1 based on programs recorded in nonvolatile memory 20. These programs include a display control program 11 for displaying various screens on the touch panel display 30 in response to user operations and the state of the multifunction device 1. If a mismatch occurs between the setting values of two or more setting items in the process of the user selecting settings while a settings screen is displayed on the touch panel display 30, the display control program 11 in this embodiment causes the processor 10 to execute a function of displaying a shortcut to the settings screen of the mismatched setting items. To enable this, the display control program 11 includes an evaluator module 11a, an adding module 11b, and an operation reception processor 11c.

The evaluator module 11a is a program module causing the processor 10 to execute a function of determining whether or not a setting value set by the user for a first setting item included in a first settings screen conforms to the setting value of a second setting item that is already set. In response to the user changing a setting value, the processor 10, by a function of the evaluator module 11a, references the conflict information 20b and determines if the newly set setting value of the setting item (first setting item) is a mismatch or a match for the setting value of a setting item (second setting item) that is already set.

The adding module 11b is a program module that causes the processor 10 to execute a function of adding to the first settings screen a shortcut operator for calling a second settings screen containing the second setting item when the setting value of the second setting item and the setting value of the first setting item do not match.

The following two patterns are included as processing patterns when the setting value of the first setting item and the setting value of the second setting item do not match. In the first pattern, the processor 10 does not automatically change the setting value of the second setting item that is already set when there is a mismatch with the setting value of the first setting item. The processor 10 then adds to the first settings screen a shortcut operator to the second settings screen to inform the user that the setting value of the second setting item does not conform to the setting value of the first setting item.

In the second pattern, the processor 10 automatically changes the setting value of the second setting item that is already set to eliminate the non-conformance with the setting value of the first setting item. The processor 10 then adds to the first settings screen a shortcut operator to the second settings screen to inform the user that the setting value of the second setting item was automatically changed.

Figure 2:
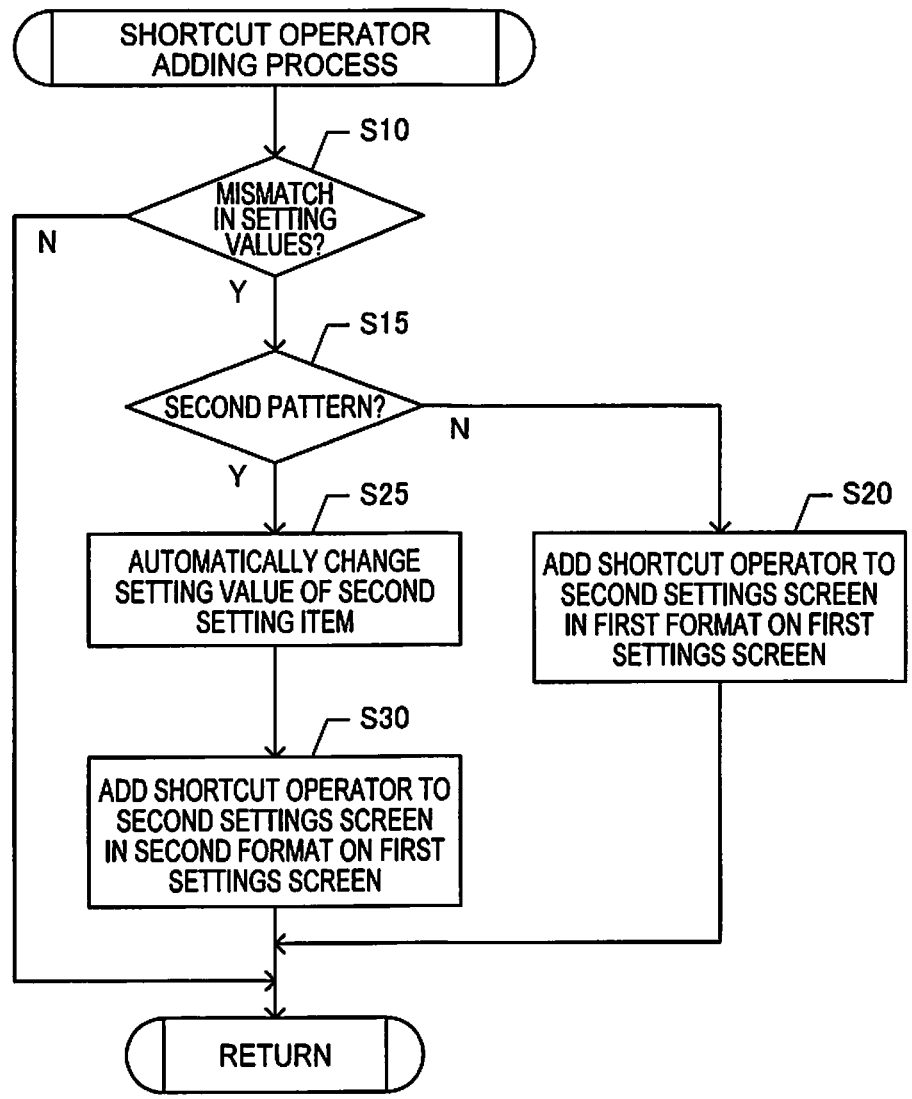
FIG. 2 is a flow chart of a shortcut operator adding process.

FIG. 2 is a flow chart of the shortcut operator adding process the processor 10 executes by functions of the evaluator module 11a and adding module 11b. In this embodiment, the process in FIG. 2 is executed in response to the setting value of any setting item being changed in the first settings screen. When the shortcut operator adding process starts, the processor 10, by a function of the evaluator module 11a, determines whether or not there is a mismatch (conflict) with the setting value (step S10). More specifically, the processor 10, based on the conflict information 20b, determines whether or not there is a conflict between the setting values of multiple setting items.

When a mismatch is found in the setting values in step S10, the processor 10, by a function of the adding module 11b, determines based on the conflict information 20b whether or not the combination of setting values that conflict is a combination of the second pattern (step S15).

If it is determined in step S15 that the combination is not the second pattern (that is, the combination is of the first pattern), the processor 10, by a function of the adding module 11b, adds to the first settings screen a shortcut operator to the second settings screen in a first format and does not change the setting value of the second setting item.

If it is determined in step S15 that combination is the second pattern, the processor 10, by a function of the adding module lib, based on the conflict information 20b, automatically changes the setting value of the second setting item to resolve the mismatch (step S25), and adds to the first settings screen a shortcut operator to the second settings screen in a second format (step S30).

Note that the first pattern (no automatic change) is used when it is preferable for the user to determine whether to change the setting value of the first setting item or the setting value of the second setting item, and for the user to change the setting value.

The second pattern is used when, to resolve the mismatch, there is a strong likelihood that the user will change the second setting item that is already set instead of the first setting item that was newly set (or when changing the setting value of the second setting item is desirable from the perspective of saving paper resources, for example).

As described above, the processor 10 displays shortcut operators in different display formats in the case of the first pattern and the case of the second pattern.

In the case of the first pattern, a shortcut operator is displayed in a first format indicating that the mismatch remains (is unresolved). The first format and second format must simply be different, and may differ in any respect. For example, the first format may be a format that gets the attention of the user more easily than the second format. In this embodiment, a shortcut operator of the first format is displayed with an exclamation mark (!) added. A shortcut operator of the second format is displayed without an added exclamation mark (!). By differing the display formats of the first pattern and second pattern, the user can be informed that the setting value of the second setting item indicated by the shortcut operator was automatically changed, or that the setting value of the second setting item was not changed and the mismatch is unresolved.

In this embodiment the second settings screen is a dedicated screen for setting the second setting item. The user can call the second settings screen by operating the shortcut operator that was added to the first settings screen by a function of the adding module 11b.

Because the second settings screen is a screen specific to the second setting item, the user can more easily find the second setting item in the second settings screen than in a configuration in which setting items other than the second setting item are included in the second settings screen. As a result, the user can easily check and change the value set for the second setting item in the second settings screen.

Note that the shortcut operator added to the first settings screen by a function of the adding module 11b may be deleted from the first settings screen in cases such as the following.

For example, when the first pattern is identified and the mismatch between setting items was resolved by the user manually changing the setting value of the first setting item or the second setting item (first condition), the shortcut operator may be removed from the first settings screen. In this case, however, the shortcut operator is not removed when the user returns from the second settings screen to the first settings screen while the mismatch has not been resolved.

In another example, when the second pattern is identified and the user operates the shortcut operator to call the second settings screen (second condition), the user has confirmed the setting value of the second setting item that was automatically changed, and returns from the second settings screen to the first settings screen, the shortcut operator may be removed from the first settings screen. The shortcut operator may also be removed when the second pattern is identified and a time exceeding a specific threshold has past without the user operating the shortcut operator (second condition).

The operation reception processor 11c is a program module that, when the setting value of the second setting item and the setting value of the first setting item match, and an operation of a first operator that is different from the shortcut operator is received, causes the processor 10 to execute a function that calls the second settings screen from the first settings screen. Unlike the shortcut operator that is added to the first settings screen when a mismatch between setting values associated with related setting items detected, the first operator is always included in the first settings screen.

The first operator is an operator separate from the shortcut operator that may be added to the first settings screen by a function of the adding module 11b. In the first embodiment and second embodiment of the invention, the Other Settings button $B_{so}$ is an example of a first operator. Therefore, when the shortcut operator is not included in the first settings screen, the user can call the second settings screen by operating the first operator. When the shortcut operator is added to the first settings screen, the user can obviously still call the second settings screen by operating the first operator.

Note that the first operator is an operator that can call the second settings screen, and in this embodiment is an operator that can call the second settings screen indirectly from the first settings screen. That is, the user, by operating the first operator in the first settings screen, can call another screen that is neither the first settings screen or second settings screen, and can call the second settings screen from this other screen by executing an operation that calls the second settings screen from this other screen.

An example of this other screen is a screen in a group of hierarchical settings screens that is on a layer between the first settings screen and second settings screen. The number of other screens in the path from the first settings screen to the second settings screen may be one or more. Therefore, while the second settings screen cannot be called directly from the first settings screen as enabled by the shortcut operator, the user can indirectly call the second settings screen from the first settings screen by operating the first operator.

In this embodiment of the invention as described above, when a setting value of the second setting item that is already set does not conform to the setting value of a first setting item that is set later, a shortcut operator for calling a second settings screen including a second setting item is added to the first settings screen. By displaying a shortcut operator that was not displayed before changing the setting value of the first setting item, the user can easily know that a shortcut operator was newly added. In addition, by operating the newly added shortcut operator, the user can display the second settings screen, and can easily check and change the value set for the second setting item. As a result, user convenience and ease of use can be improved when changing settings on an electronic device.

(1-2) Example 1

An example of adding a shortcut operator without automatically changing the setting value when there is a conflict between the setting values of multiple setting items is described next with reference to the sequence diagram in FIG. 3 and the screen samples shown in FIG. 4 to FIG. 9.

Figure 3:
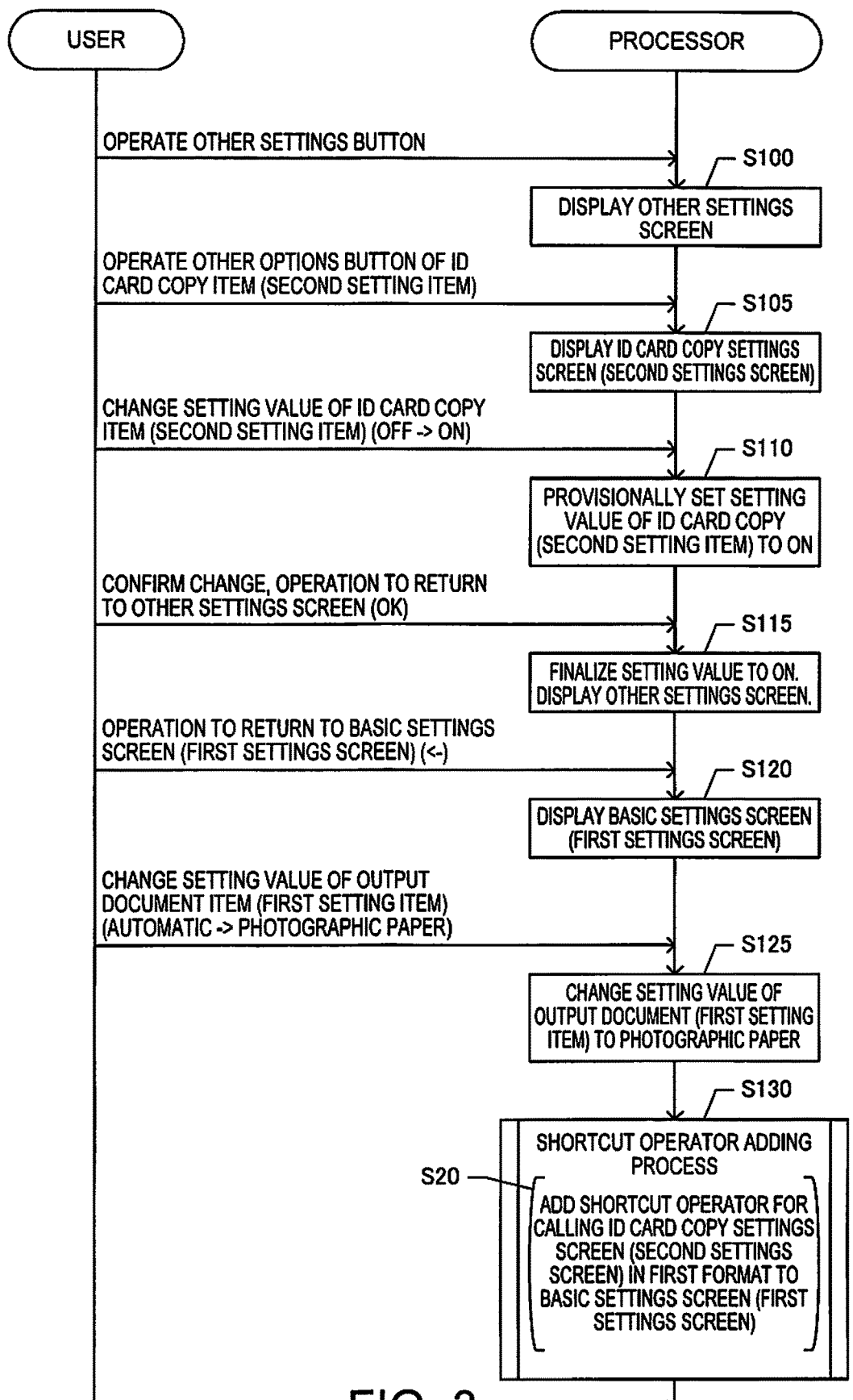
FIG. 3 is a sequence diagram of a first example.

The sequence diagram in FIG. 3 starts with the basic settings screen (an example of a first settings screen in this embodiment) shown in FIG. 4 already displayed on the touch panel display 30.

When the basic settings screen shown in FIG. 4 is displayed on the touch panel display 30 and the user operates (touches) the Other Settings button $B_{so}$, the processor 10, by a function of the operation reception processor 11c, displays the Other Settings screen shown in FIG. 5 (step S100).

When the Other Settings screen shown in FIG. 5 is displayed and the user operates other options button $B_{27}$ in the ID card copy setting item, the processor 10, by a function of the operation reception processor 11c, displays the ID card copy settings screen (an example of the second settings screen in this embodiment) shown in FIG. 6 (step S105).

When the ID card copy settings screen shown in FIG. 6 is displayed and the user operates operator $S_{ic}$ to switch the ID card copy function from Off to On, the processor 10 provisionally turns the ID card copy function on in response to the user operation (step S110).

Figure 7:
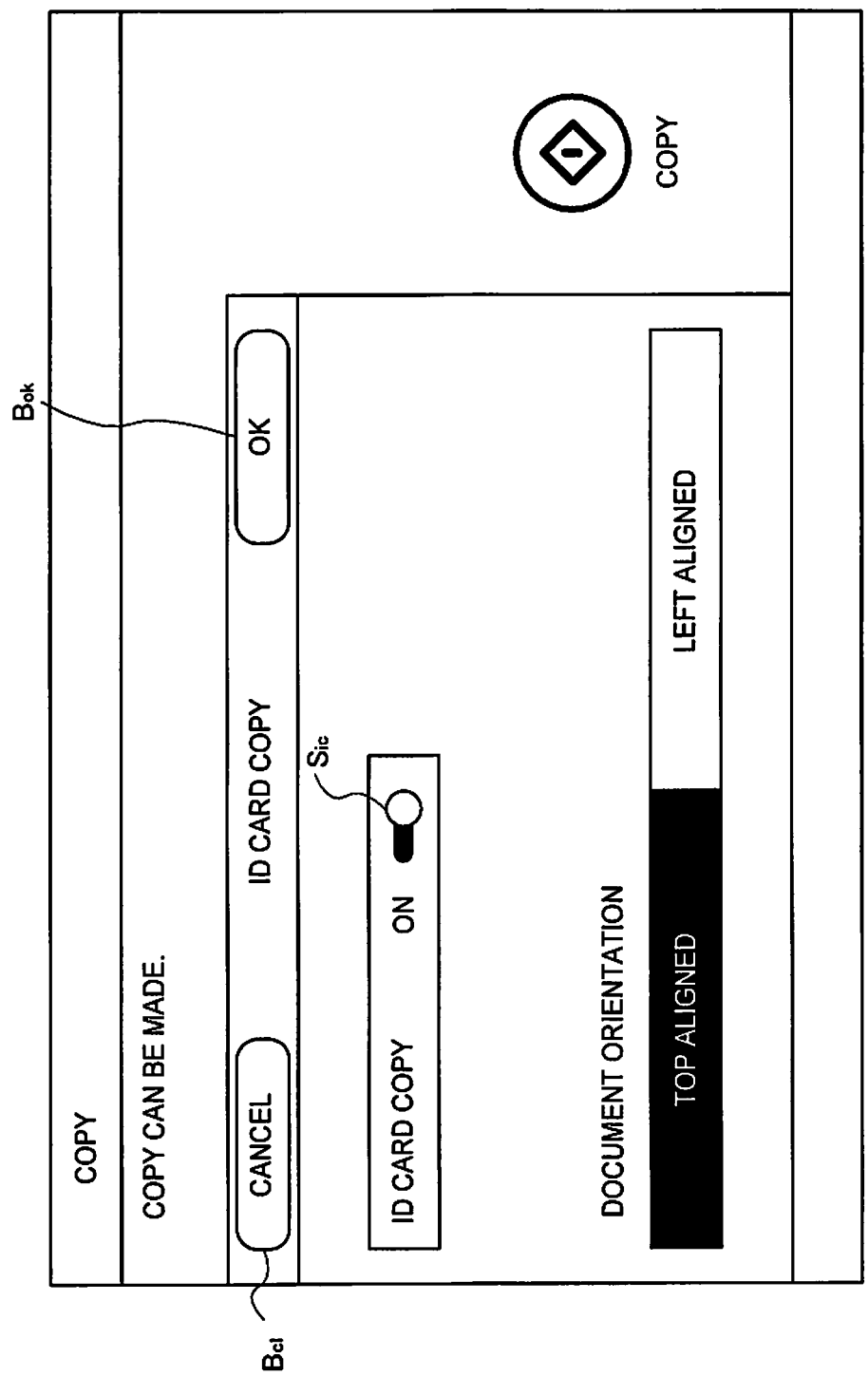
FIG. 7 shows a screen for copying an ID card.

FIG. 6 illustrates the ID card copy settings screen when the ID card copy function is off, and FIG. 7 illustrates the ID card copy settings screen when the ID card copy function is on. FIG. 7 also shows that the direction in which the document is set is top aligned. Note that after the user changes the ID card copy function from Off to On, the user can still change the default setting for the document alignment from top aligned to left aligned.

Note also that when a rectangular ID card is set on the document platen, setting the ID card so that the scanning surface of the ID card is face down, and the top edge of the scanning surface of the ID card is aligned with (parallel or substantially parallel to) the side of the document platen that is away from the user when the user is looking at the document platen, is referred to as top aligned. When the ID card is placed so that the scanning surface of the ID card is face down, and the top edge of the scanning surface of the ID card is rotated 90 degrees (or approximately 90 degrees) from the top aligned position, is referred to as left aligned.

In step S110 the processor 10 provisionally sets the ID card copy function to On and the document orientation to top aligned, and displays a screen showing that the ID card copy function is on as shown in FIG. 7. When the ID card copy settings screen shown in FIG. 7 is displayed and the user confirms the change and returns to the Other Settings screen (operates OK button $B_{ok}$), the processor 10 finalizes the setting values provisionally set in step S110, and displays the Other Settings screen (step S115).

Figure 8:
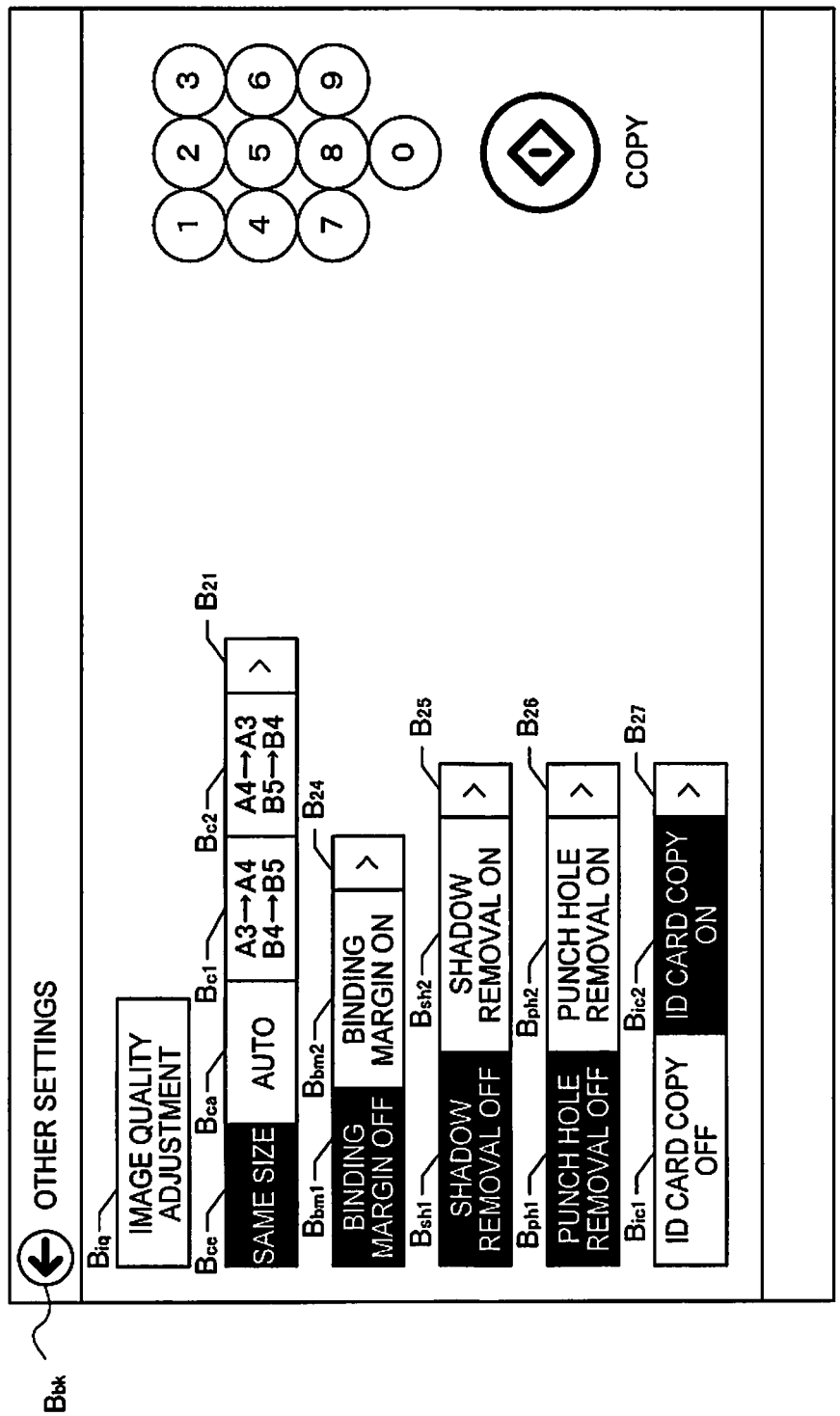
FIG. 8 shows an example of another settings screen in the first embodiment of the invention.

Note that the processor 10 finalizes the provisional settings by changing the ID card copy function in the configuration data 20a to On, and the document orientation setting of the ID card copy function to top aligned. The processor 10 also stops displaying the ID card copy settings screen shown in FIG. 7, and displays the Other Settings screen shown in FIG. 8. FIG. 8 shows the ID card copy function set to On.

When the ID card copy settings screen shown in FIG. 7 is displayed and the Cancel button $B_{ci}$ is operated (not shown in FIG. 3), the processor 10 destroys the provisional settings made in step S110, and the ID card copy settings in the configuration data 20a do not change. The processor 10 also stops displaying the ID card copy settings screen shown in FIG. 7, and returns the display to the Other Settings screen.

Note that the ID card copy function can also be changed from Off to On by operating the ID card copy ON button $B_{ic2}$ when the Other Settings screen shown in FIG. 5 is displayed.

When the user operates the Return button $B_{bk}$ after step S115, that is, when the Other Settings screen shown in FIG. 8 is displayed, the processor 10 returns to the basic settings screen (first settings screen) shown in FIG. 4 (step S120).

Next, when the basic settings screen shown in FIG. 4 is displayed and the user changes the setting value of the output document (an example of a first setting item in this embodiment) from Automatic A4 plain paper (button $B_{ta}$) to Tray 2 A4 photographic paper (button $B_{t2}$), the processor 10 changes the setting value of the output document (first setting item) to Tray 2 A4 photographic paper (step S125). More specifically, the processor 10 changes the setting value of the output document in the configuration data 20a to Tray 2 A4 photographic paper.

Next, the processor 10 executes the shortcut operator adding process shown in FIG. 2 in response to a setting value of a setting item in the first settings screen being changed (step S130). When the shortcut operator adding process is executed in this example of the sequence, that is, when in step S110 the ID card copy function is changed to On and in step S125 the output document is changed from Automatic A4 plain paper to Tray 2 A4 photographic paper, step S130 executes as described below.

More specifically, in step S10 in FIG. 2, the processor 10, by a function of the evaluator module 11a, determines based on the conflict information 20b whether or not there is a mismatch between the setting values of the setting items. In this example, because the combination of the ID card copy function set to On and the output document set to Tray 2 A4 photographic paper is defined in the conflict information 20b as a mismatched combination, a conflict is identified and control goes to step S15. This combination is also defined in the conflict information 20b as a first pattern. Therefore, in step S15, the processor 10, by a function of the adding module 11b, determines the combination is not the second pattern (is the first pattern).

In step S20 the processor 10 therefore adds a shortcut operator for calling the ID card copy settings screen (second settings screen) to the first settings screen in the first format. As a result, in step S130 in FIG. 3 the processor 10 does not automatically change the setting values related to the ID card copy function, and the conflict remains.

Figure 9:
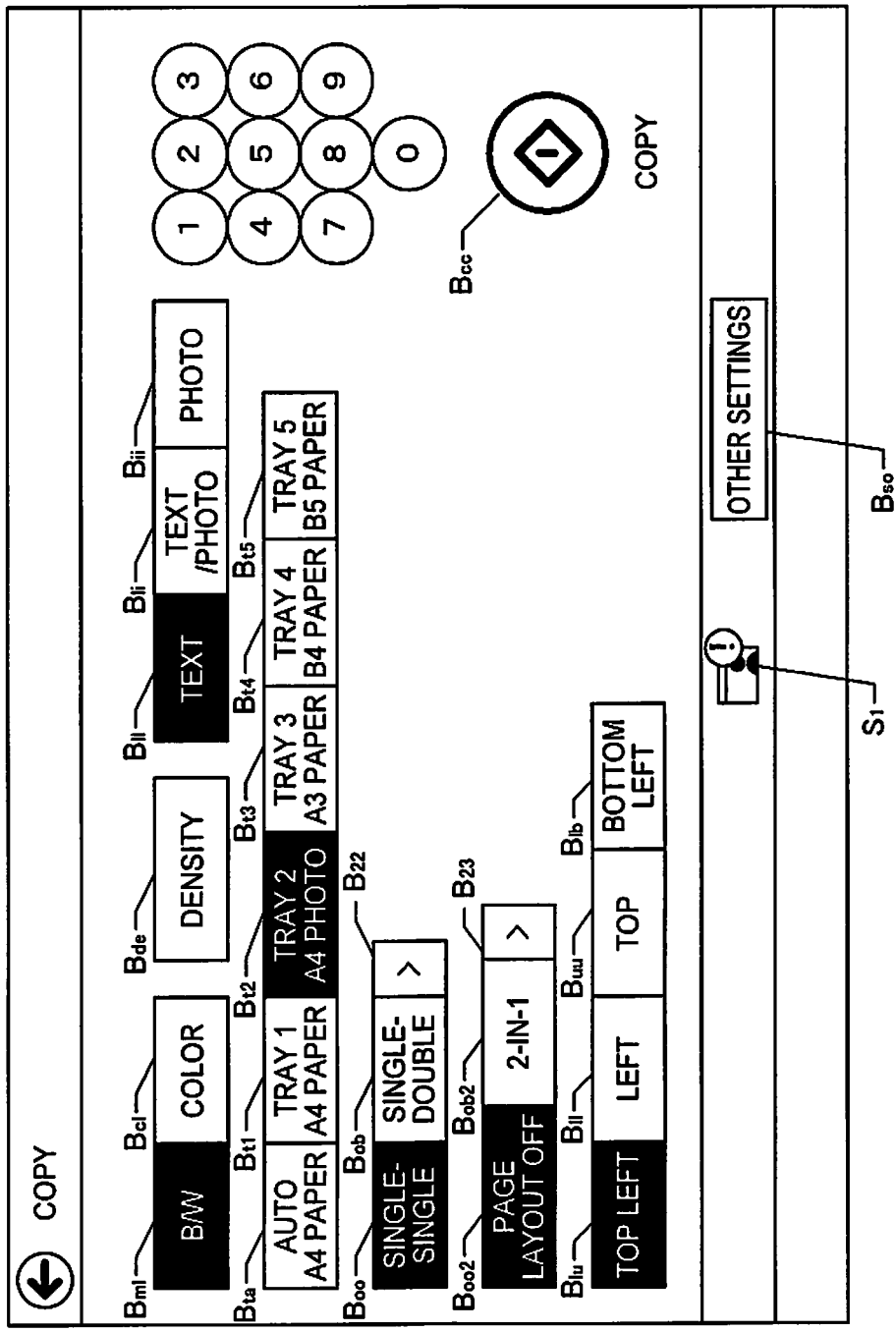
FIG. 9 shows an example of another settings screen in the first embodiment of the invention.

FIG. 9 shows the basic settings screen (first settings screen) when the ID card copy function is changed to On in step S110, and in step S120 the output document is changed from Automatic A4 plain paper to Tray 2 A4 photographic paper. In FIG. 9, reference numeral $S_1$ indicates a shortcut operator for going to the ID card copy settings screen. Because the shortcut operator $S_1$ to the ID card copy settings screen in this sample sequence indicates that there is a mismatch related to the ID card copy settings, the shortcut operator $S_1$ is displayed with an exclamation mark (!) (first format).

The shortcut operator $S_1$ is displayed in a rectangular area at the bottom of the basic settings screen. The Other Settings button $B_{so}$ is also displayed in this rectangular area. Shortcut operators to other screens added for other reasons may also be displayed in this rectangular area.

Figure 10:
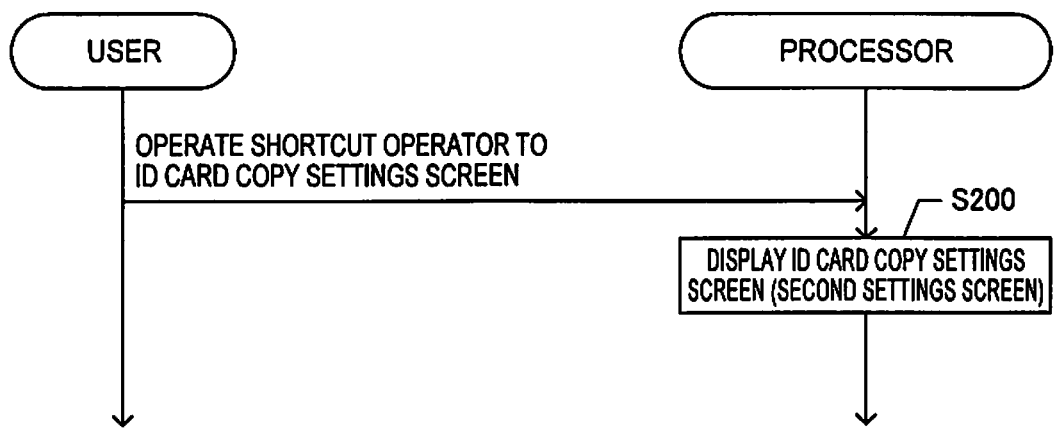
FIG. 10 is a sequence diagram for operating the shortcut operator.

FIG. 10 is a sequence diagram that starts with a shortcut operator $S_1$ to the ID card copy settings screen is displayed in the basic settings screen as shown in FIG. 9. When the user then operates the shortcut operator $S_1$, the processor 10 displays the ID card copy settings screen (step S200). More specifically, the user can call the ID card copy settings screen directly from the basic settings screen. As a result, the user can easily call the ID card copy settings screen, which is the screen showing the setting that is the cause of the mismatch, and check the setting. If necessary, the user can also easily change a setting value related to the ID card copy function (that is, the setting value that is the cause of the mismatch). In addition, when the user changes the setting value related to the ID card copy function (that is, the setting value that is the cause of the mismatch), the user can also easily check and change the value set as the document orientation (that is, another setting value related to the setting value that is the cause of the mismatch).

(1-3) Example 2

Next, an example of automatically changing a setting value to resolve a mismatch, and adding a shortcut operator, when there is a conflict between the setting values of multiple setting items is described next with reference to the sequence diagram in FIG. 11 and the screen samples shown in FIG. 4, FIG. 5, FIG. 12, and FIG. 13.

Figure 11:
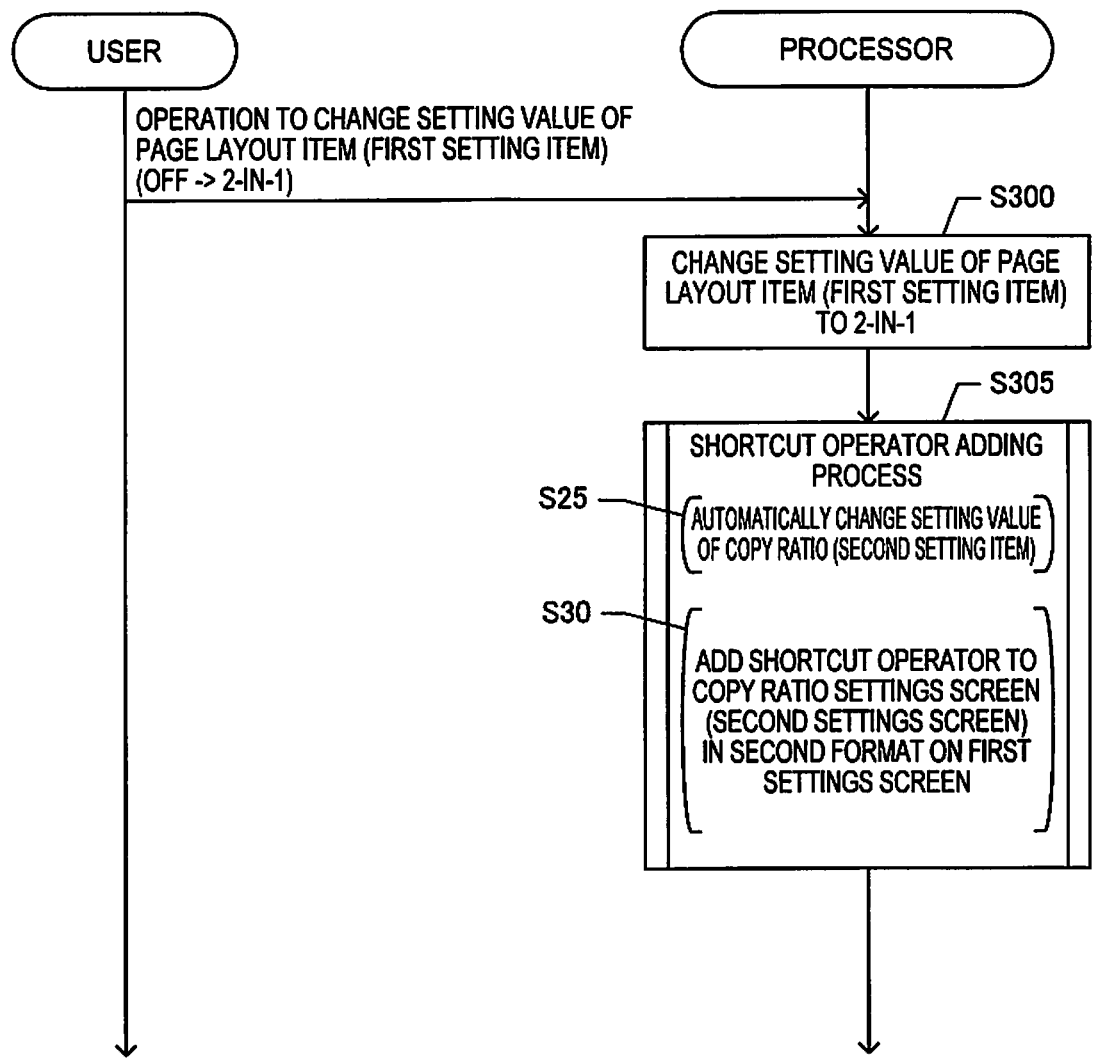
FIG. 11 is a sequence diagram of a second example.

The sequence diagram in FIG. 11 starts with the basic settings screen (an example of a first settings screen in this embodiment) shown in FIG. 4 already displayed on the touch panel display 30. In this example the initial value of the copy ratio, which is one setting item, is Same Size (100%), and when the sequence in FIG. 11 starts, the initial value of the setting values in the copy ratio setting item is set to Same Size. The setting value of the second setting item may have been previously changed and set by the user, or previously set as an initial value or default value. This example corresponds to the latter case.

In this embodiment of the invention the copy ratio is included in the Other Settings screen such as shown in FIG. 5, and not in the basic settings screen (first settings screen). When the user operates the Other Settings button $B_{so}$ (an example of a first operator), the processor 10, by a function of the operation reception processor 11c, displays the Other Settings screen. In the Other Settings screen shown in FIG. 5, the user can select the copy ratio from the following settings: Same Size, Automatic, A3->A4 B4->B5, and A4->A3 B5->B4. The user can select other copy ratios from a copy ratio settings screen, which is a dedicated settings screen related to the copy ratio (see FIG. 12, an example of a second settings screen in this example).

When the user operates the other options button $B_{21}$ for the copy ratio in the Other Settings screen (such as in FIG. 5), the processor 10, by a function of the operation reception processor 11c, displays the copy ratio settings screen (second settings screen).

Referring again to the sequence diagram in FIG. 11, when the basic settings screen shown in FIG. 4 is displayed on the touch panel display 30 and the user performs an operation changing the page layout (an example of a first setting item in this example) setting from Off to 2-in-1, the processor 10 changes the setting value for page layout to 2-in-1 in response to the user operation (step S300). The processor 10 then changes the page layout value in the configuration data 20a to 2-in-1.

Next, the processor 10 executes the shortcut operator adding process shown in FIG. 2 in response to a setting value of a setting item in the first settings screen being changed (step S305). When the shortcut operator adding process is executed in this sample sequence, that is, when the initial value of the copy ratio (second settings screen) is Same Size, and in step S300 the value for page layout (first setting item) is changed to 2-in-1, the following process is executed in step S305.

The combination of the copy ratio being set to Same Size (that is, neither enlargement or reduction are applied), and the output document being set to 2-in-1 to print two pages on one page, is defined in the conflict information 20b as a conflicting combination of setting values. This combination is also defined in the conflict information 20b as a second pattern. Therefore, in step S10 in FIG. 2 the processor 10 identifies a mismatch by a function of the evaluator module 11a. In addition, in step S15, the processor 10, by a function of the adding module 11b, identifies a second pattern. As a result, step S25 and step S30 are executed.

In step S25, the processor 10, by a function of the adding module 11b, automatically changes the value of the copy ratio setting (second setting item). More specifically, the processor 10 references the conflict information 20b, and automatically changes the copy ratio setting to resolve the conflict with the 2-in-1 setting.

More specifically, the processor 10 changes the initial value of the copy ratio setting, Same Size, to Automatic. By changing the copy ratio setting to Automatic, the conflict with the page layout (first setting item) setting of 2-in-1 is resolved.

Figure 13:
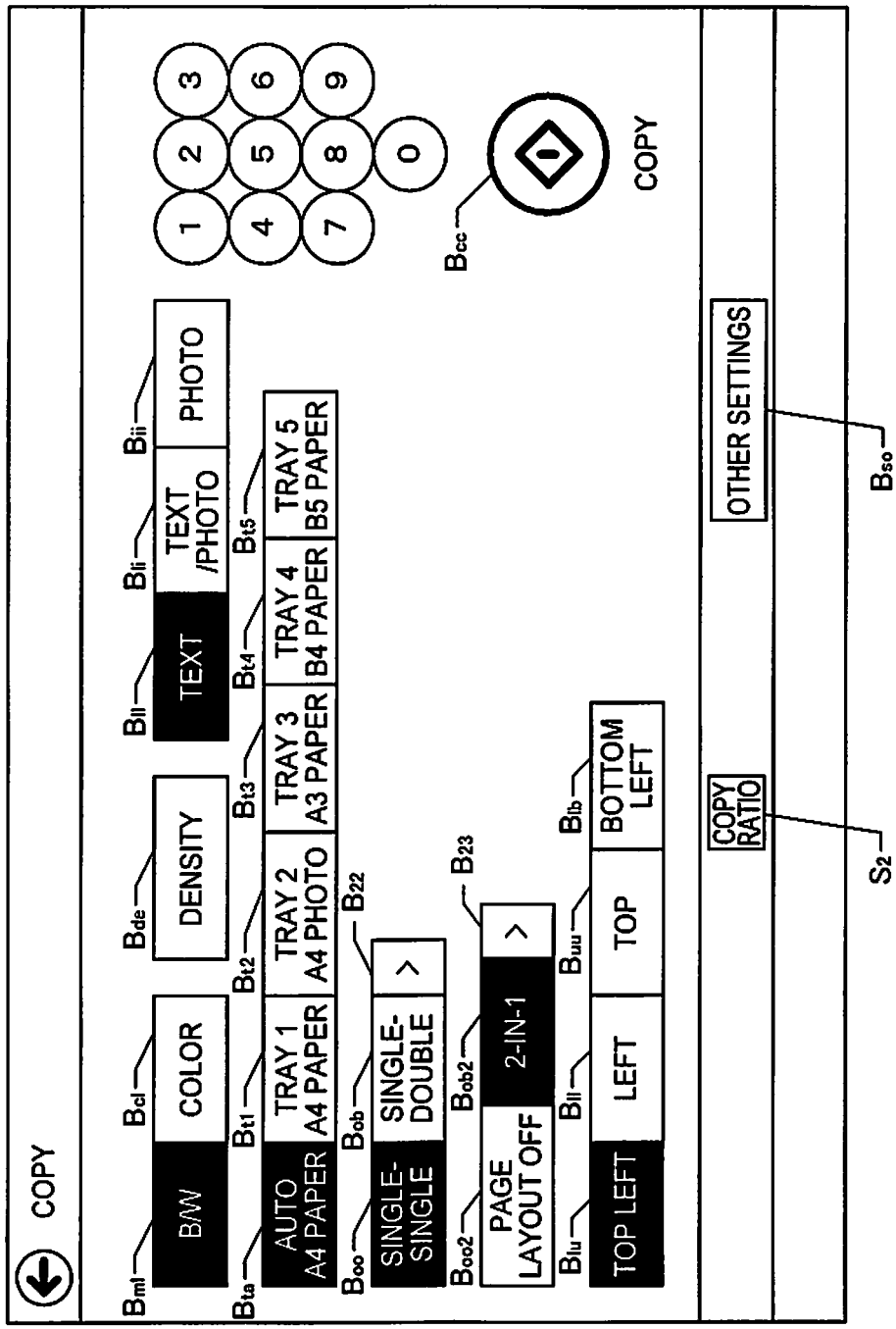
FIG. 13 shows a basic settings screen in the first embodiment of the invention.

In step S30, the processor 10, by a function of the adding module 11b, adds to the basic settings screen (first settings screen) in the second format a shortcut operator for calling the copy ratio settings screen (second settings screen). Operator $S_2$ in FIG. 13 is a shortcut operator to the copy ratio settings screen (second settings screen). Unlike in example 1 above, the shortcut operator $S_2$ is displayed without an added exclamation mark (!) (second format).

Figure 14:
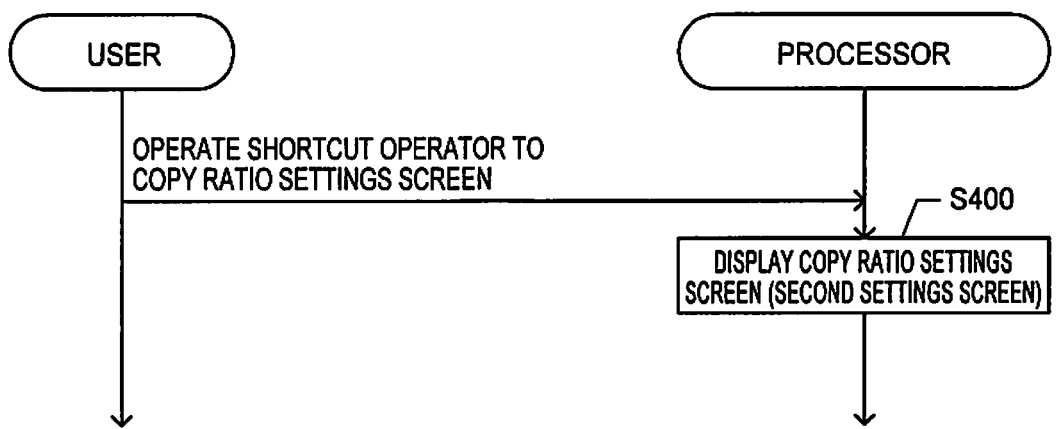
FIG. 14 is a sequence diagram for operating the shortcut operator.

FIG. 14 is a sequence diagram that starts with the shortcut operator $S_2$ to the copy ratio settings screen displayed in the basic settings screen. When the user then operates the shortcut operator $S_2$, the processor 10 displays the copy ratio settings screen (step S400). More specifically, the user can call the copy ratio settings screen directly from the basic settings screen. As a result, can easily check the value set as the copy ratio from the copy ratio settings screen.

Figure 12:
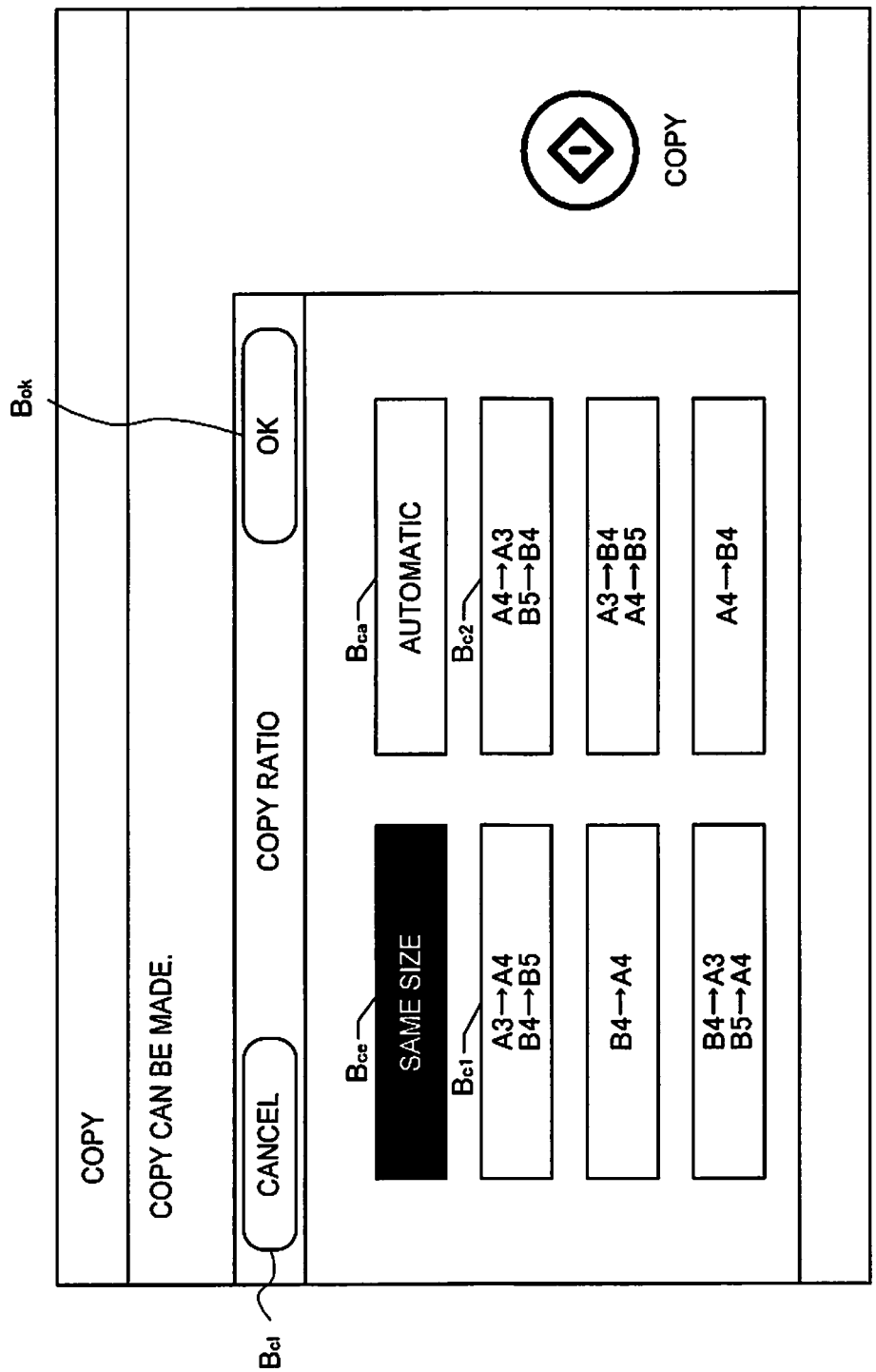
FIG. 12 shows a screen for setting the copy ratio.
Figure 15:
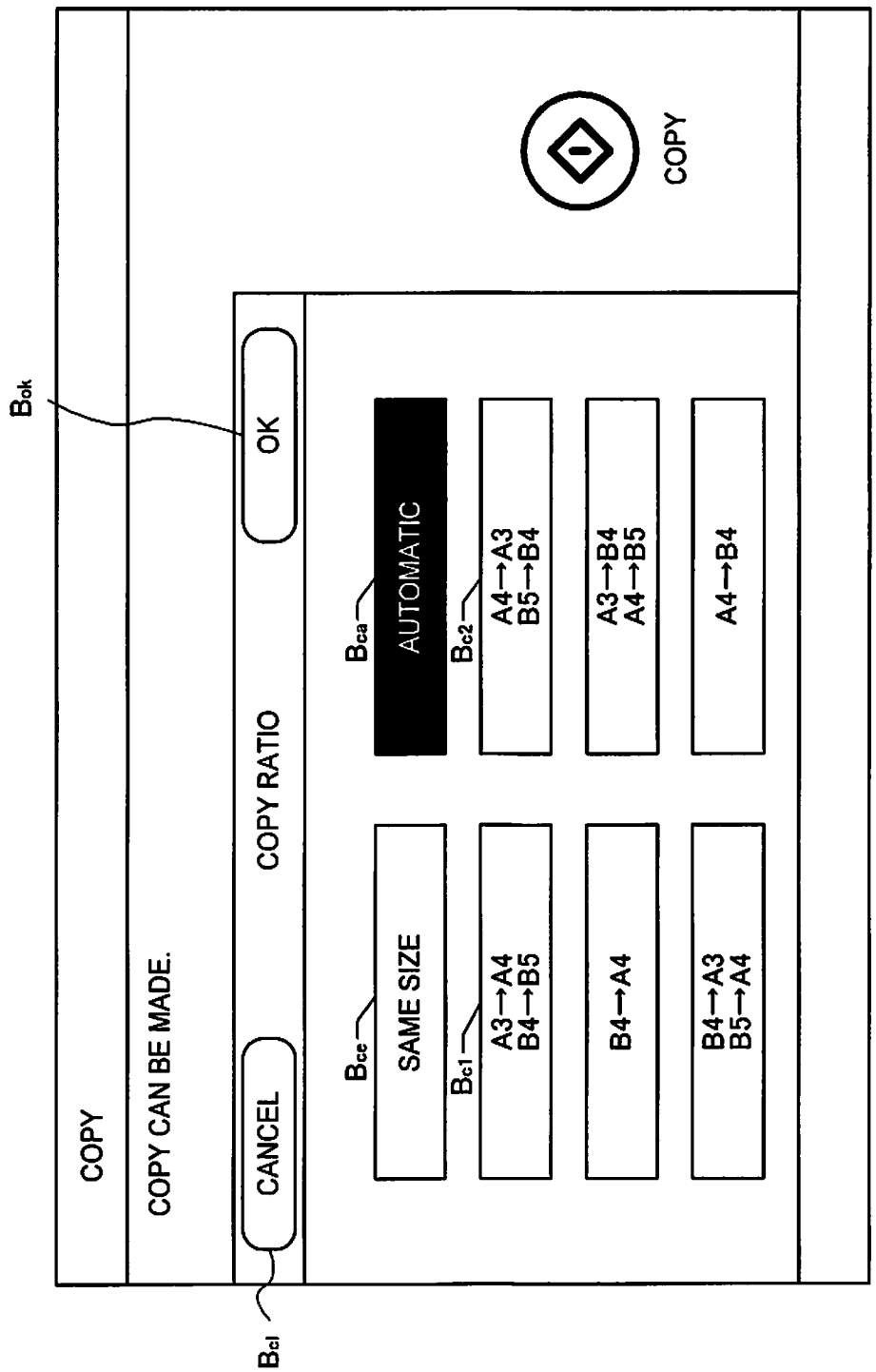
FIG. 15 shows a screen for setting the copy ratio.

For example, when the sequence shown in FIG. 14 is executed after the sequence in FIG. 11 as described above, the processor 10 displays the copy ratio settings screen shown in FIG. 15 in step S400 in FIG. 14. The value set for the copy ratio in FIG. 15 is set to Automatic. More specifically, the setting is changed from the initial value of Same Size as shown in FIG. 12 to Automatic as shown in FIG. 15. As a result, by operating the shortcut operator $S_2$ to display the copy ratio settings screen, the user can check that the copy ratio is set to Automatic. If necessary, the user can also change the copy ratio setting.

(2) Embodiment 2

The second embodiment of the invention differs from the first embodiment in the types of setting items contained in the basic settings screen (also an example of a first settings screen in this embodiment).

Figure 16:
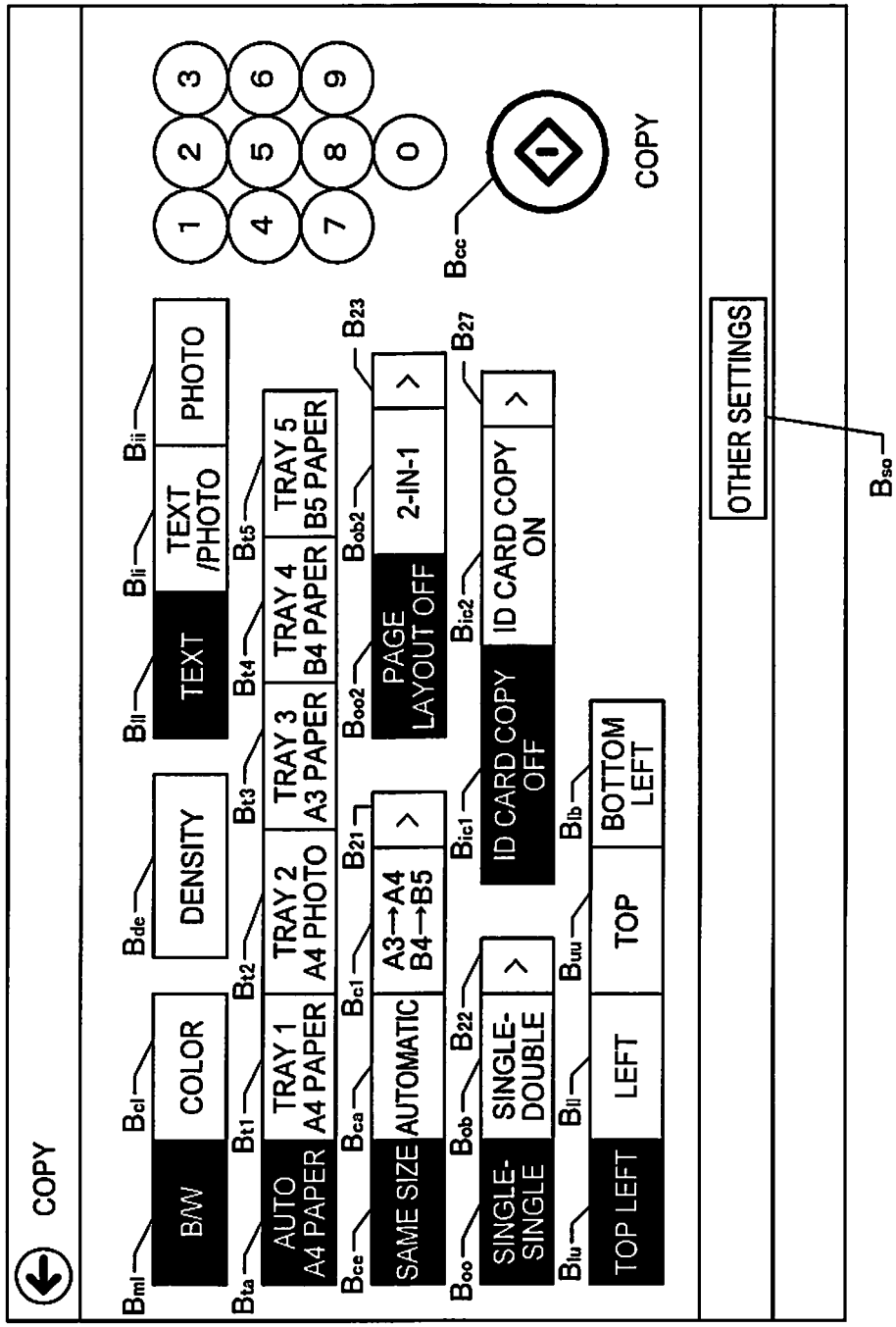
FIG. 16 shows a basic settings screen in the second embodiment of the invention.

FIG. 16 shows an example of the basic settings screen for the copier function in this second embodiment. As shown in FIG. 16, the following setting items are included in the basic settings screen in this embodiment. More specifically, included are the color of the recording material recorded on the output document (as options, buttons $B_{m1}$, $B_{c1}$), the print density (button $B_{de}$ for calling the print density setting screen), the type of image (as options, buttons $B_{1l}$, $B_{1i}$, $B_{ii}$), the output document (as options, buttons $B_{ta}$, $B_{t1}$, $B_{t2}$, $B_{t3}$, $B_{t4}$, $B_{t5}$), the copy ratio (as options, buttons $B_{ce}$, $B_{ca}$, $B_{c1}$, and other options button $B_{21}$), page layout (as options, buttons $B_{oo2}$, $B_{ob2}$, and other options button $B_{23}$), the printing surface (as options, buttons $B_{oo}$, $B_{ob}$, and other options button $B_{22}$), ID card copy (as options, buttons $B_{ic1}$, $B_{ic2}$, and other options button $B_{27}$), and the binding position (as options, buttons $B_{1u}$, $B_{1l}$, $B_{uu}$, $B_{1b}$).

Note that, as in the firsts embodiment, other setting items not included in the basic settings screen can be set in an Other Settings screen, or set in a dedicated settings screen that can be called through another settings screen for setting other items.

Example 1 and example 2 in the first embodiment are configured to contain first setting items in a first settings screen, and second setting items are not contained in the first settings screen. In example 3 and example 4 in this embodiment, both second setting items and first setting items are included in the first settings screen. More specifically, in this second embodiment of the invention, when the value of a setting item that is newly changed conflicts with the setting value of a setting item that is already set in the same screen, a shortcut operator to a settings screen for the setting item that is already set and conflicts (is a mismatch) is added.

(2-1) Example 3

Figure 17:
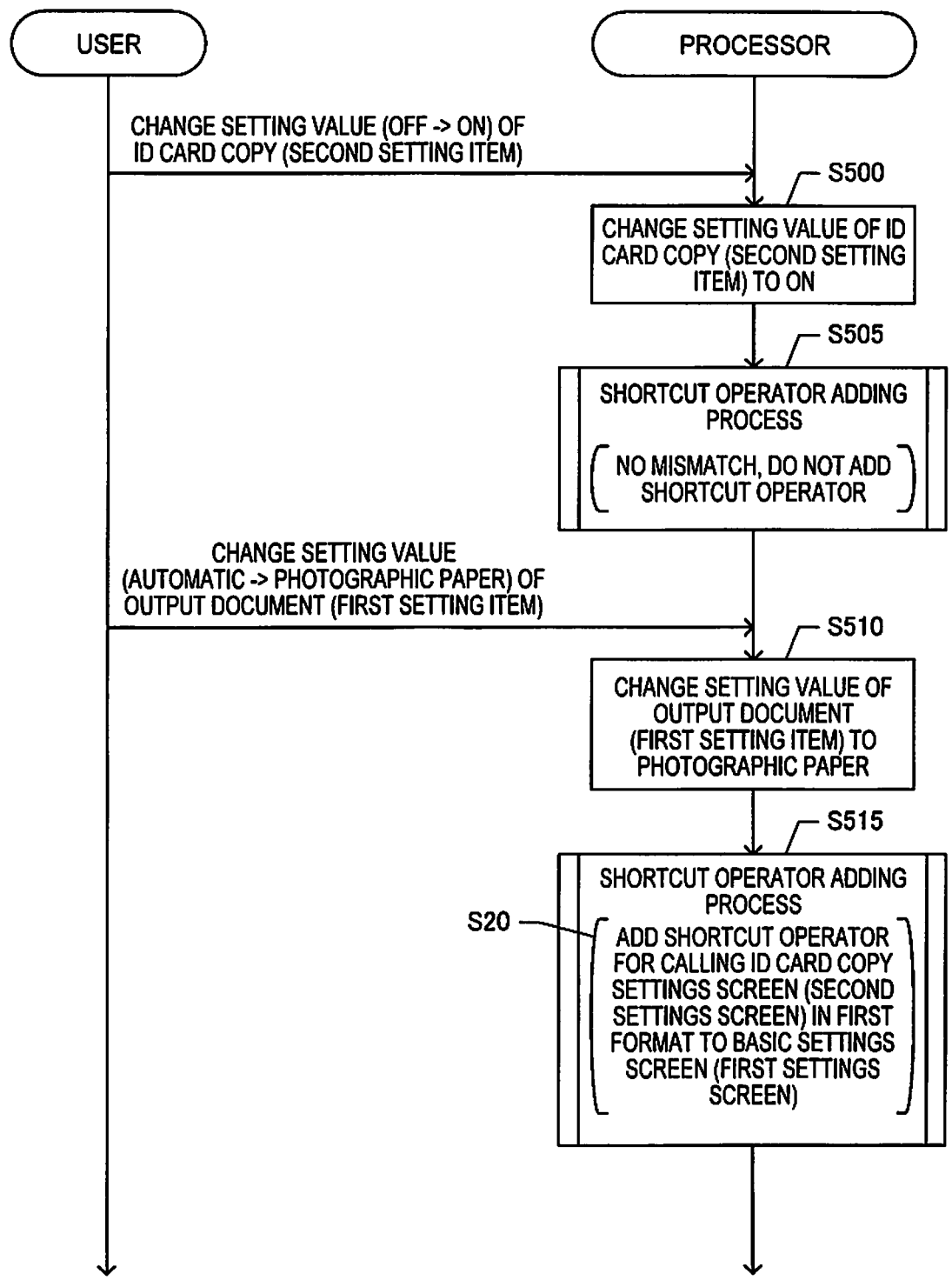
FIG. 17 is a sequence diagram of a third example.

As in the first example, the ID card copy is an example of a second setting item and the output document is an example of a first setting item. The sequence of the third example is described below with reference to the sequence diagram in FIG. 17 and the screen samples shown in FIG. 16, FIG. 18, and FIG. 19. The sequence diagram in FIG. 17 starts with the basic settings screen shown in FIG. 16 already displayed on the touch panel display 30.

When the basic settings screen shown in FIG. 16 is displayed on the touch panel display 30 and the user changes the setting value of the ID card copy (second setting item) from Off (button $B_{ic1}$) to On (button $B_{ic2}$), the processor 10 changes the value of the ID card copy setting to On in response to the user operation (step S500). The processor 10 updates the setting value of the ID card copy function to On in the configuration data 20a, and as shown in FIG. 18 updates the display to show that On (button $B_{ic2}$) was selected for the ID card copy function.

The processor 10 then executes the shortcut operator adding process shown in FIG. 2 in response to the setting value of a setting item being changed in the shortcut operator $S_1$ (step S505). In this case a shortcut operator is not added because a conflict is identified in step S10.

Figure 18:
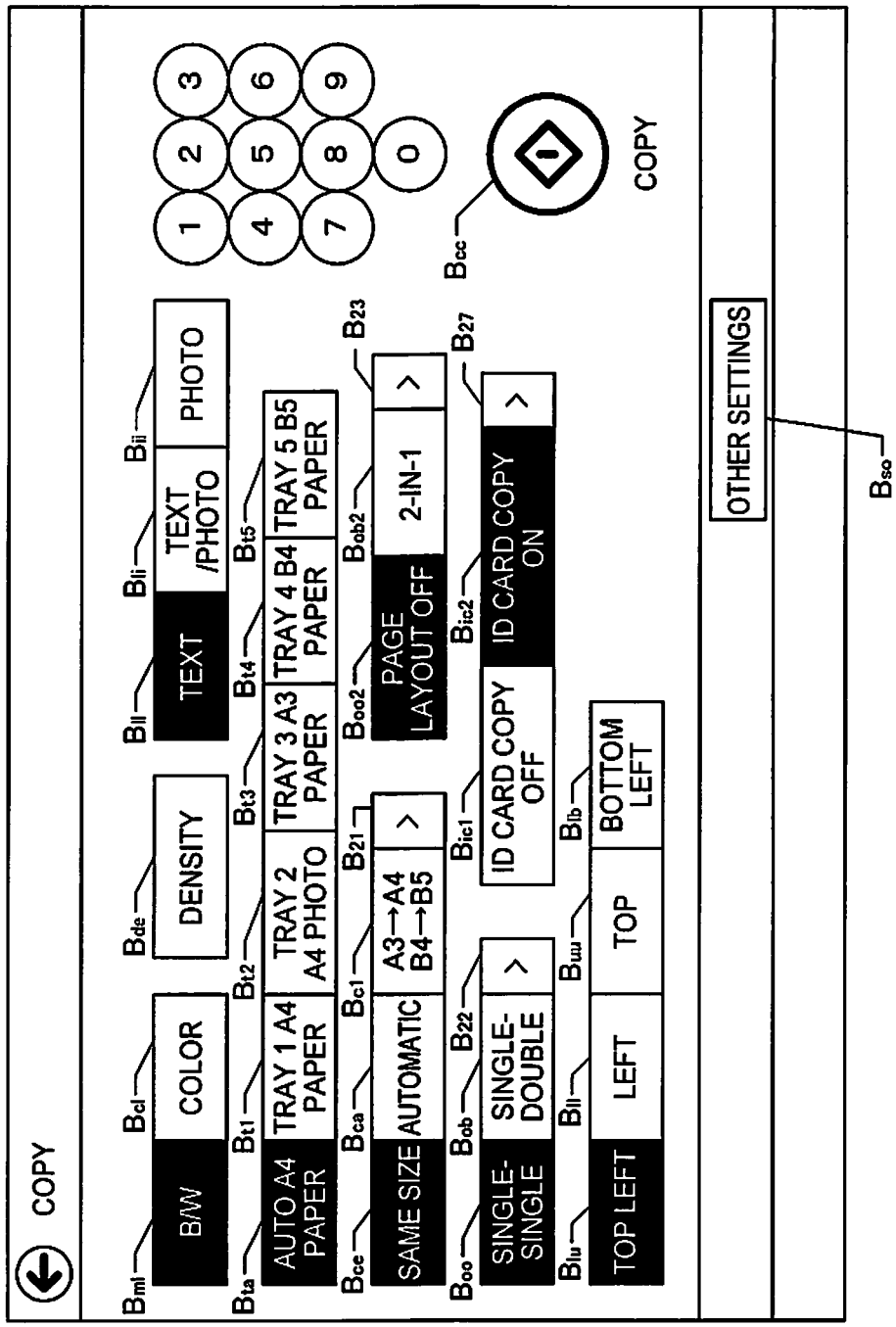
FIG. 18 shows an example of a basic settings screen related to a second embodiment of the invention.

Next, when the basic settings screen shown in FIG. 18 is displayed and the user changes the setting value of the output document (an example of a first setting item) from Automatic A4 plain paper (button $B_{ta}$) to Tray 2 A4 photographic paper (button $B_{t2}$), the processor 10 changes the value of the output document setting (first setting item) to Tray 2 A4 photographic paper. More specifically, the processor 10 updates the value of the output document setting in the configuration data 20a to Tray 2 A4 photographic paper.

Next, the processor 10 executes the shortcut operator adding process shown in FIG. 2 in response to a setting value of a setting item in the first settings screen being changed (step S515). More specifically, in step S20 the processor 10 adds a shortcut operator for calling the ID card copy settings screen (second settings screen) in the first format to the basic settings screen (first settings screen). As a result, as shown in FIG. 19, the shortcut operator $S_1$ to the ID card copy settings screen is displayed with an exclamation mark (!).

Figure 19:
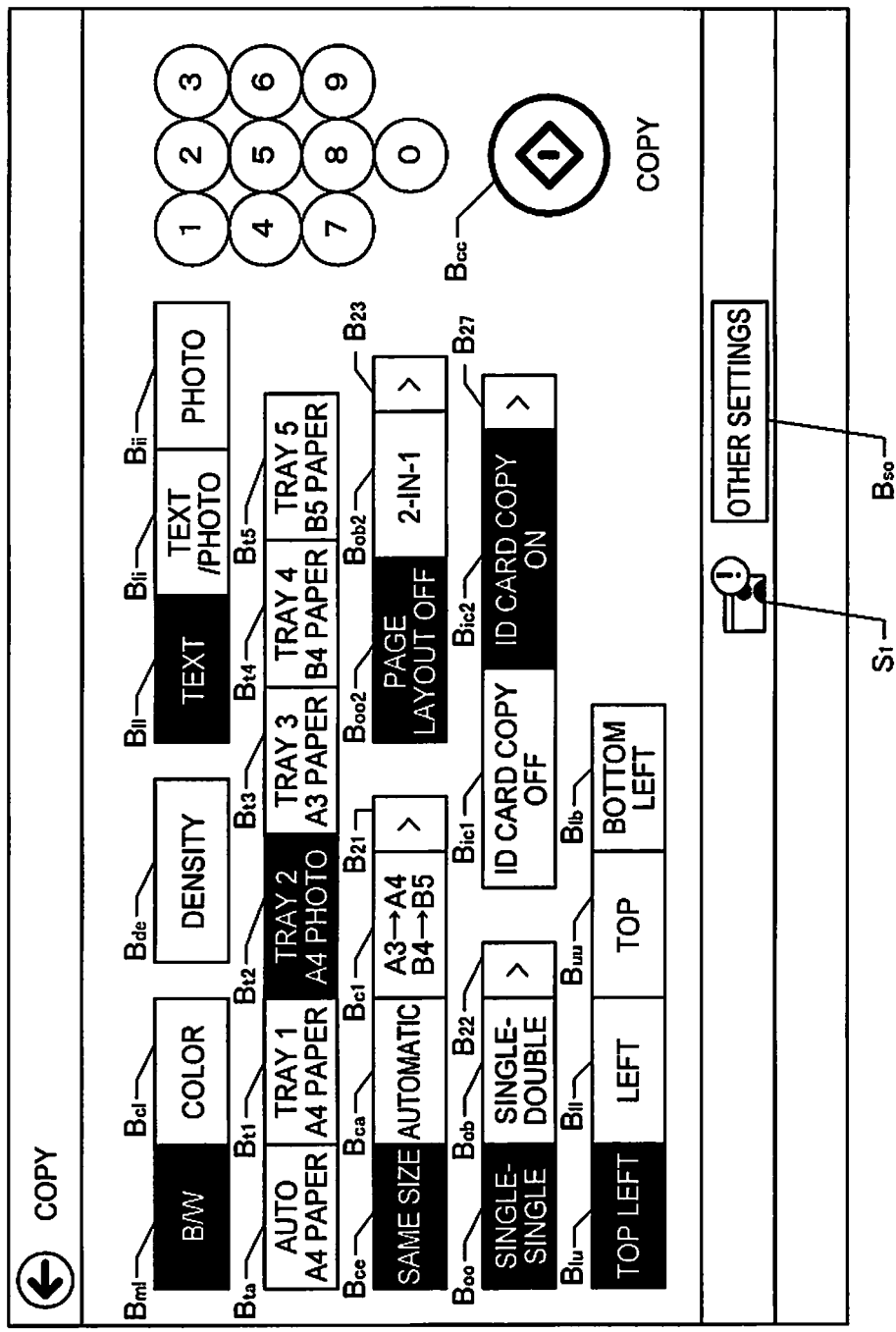
FIG. 19 shows an example of a basic settings screen related to a second embodiment of the invention.

Note that when the user operates the shortcut operator $S_1$ when the screen shown in FIG. 19 is displayed, the user can directly call the ID card copy settings screen from the basic settings screen in the same way as described in the sequence shown in FIG. 10.

(2-2) Example 4

As in example 2 above, page layout is an example of a first setting item in example 4. The sequence of example 4 is described below with reference to the screen samples shown in FIG. 16 and FIG. 20. Note that because the sequence in example 4 can be described by the sequence of example 2 (FIG. 11) in the first embodiment, the sequence is described with reference to FIG. 11.

In example 4, the sequence of FIG. 11 starts with the basic settings screen shown in FIG. 16 displayed. More specifically, the copy ratio is set to Same Size, and page layout is set to Off.

When the basic settings screen shown in FIG. 16 is displayed and the user performs an operation changing the value of the page layout (a first setting item) setting from Off to 2-in-1, the processor 10 changes the setting value for page layout to 2-in-1 (step S300). More specifically, the processor 10 changes the value of the page layout setting in the configuration data 20a to 2-in-1.

Next, the processor 10 executes the shortcut operator adding process (step S305). More specifically, the processor 10 changes the value of the copy ratio setting (second settings screen) from Same Size to Automatic, and adds a shortcut operator $S_2$ to the copy ratio settings screen. As a result, as shown in FIG. 20, the shortcut operator $S_2$ to the copy ratio settings screen is displayed without an added exclamation mark (!).

Figure 20:
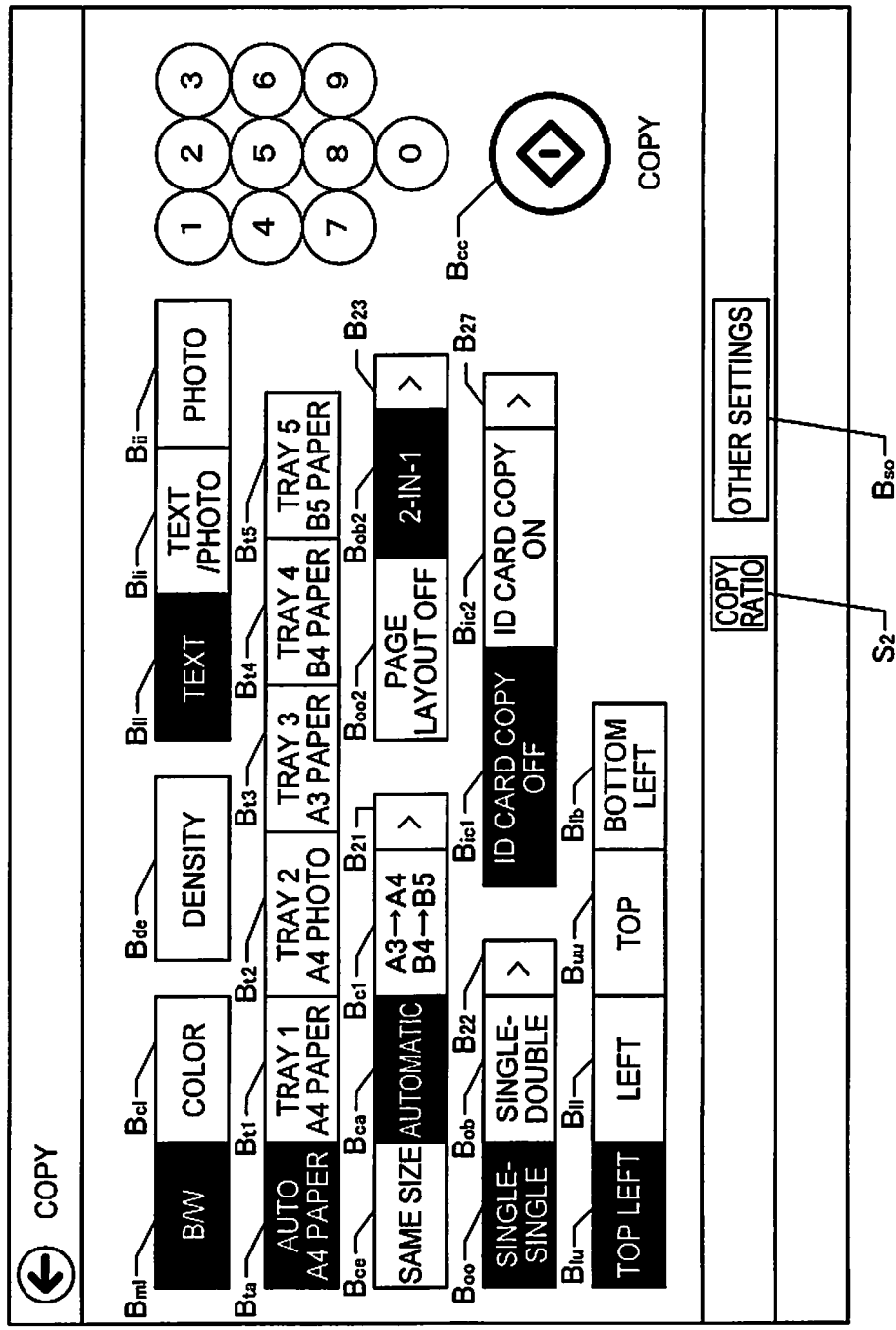
FIG. 20 shows an example of a basic settings screen related to a second embodiment of the invention.

Note that when the screen shown in FIG. 20 is displayed and the user operates the shortcut operator $S_2$, the user can call the copy ratio settings screen directly from the basic settings screen as described in the sequence shown in FIG. 14.

(3) Other Embodiments

The foregoing embodiments are examples of preferred embodiments of the invention, and other configurations are conceivable as long a shortcut operator for calling a second settings screen containing a second setting item is added to the first settings screen when the value the user set for a first setting item contained in the first settings screen does not conform to the setting value of the second setting item that is already set, and the second settings screen is called from the first settings screen if operation of a first operator that is different from the shortcut operator is received when the setting values match.

For example, the electronic device is not limited to a multifunction device, and may be various other types of devices having a display (or connectable to a display), including a personal computer, a table terminal, or a smartphone. In addition, the display control program may be included in a driver program of a multifunction device that is invoked by a personal computer, tablet terminal, smartphone, or other device capable of communicating with the multifunction device and using functions of the multifunction device.

When the invention is also not limited to settings related to a copier function when applied to a multifunction device or driver program of an multifunction device. The invention can obviously also be applied to settings related to various other functions, including printer functions, scanner functions, and fax functions.

The evaluator module must be able to determine whether or not a setting value the user set for a first setting item contained in a first settings screen conforms to the setting value of a second setting item that is already set. In the embodiments described above, the basic settings screen that is displayed first as a settings screen for the copier function is an example of a first settings screen, and the other screens are configurations not equivalent to a first settings screen, but screens other than the basic settings screen may also be configured equivalently to a first settings screen. Configurations in which screens other than the basic settings screen and the basic settings screen become a first settings screen according to the circumstances are also conceivable.

More specifically, in the basic settings screen shown in FIG. 4, when Tray 2 A4 photographic paper is selected as the output document, and the ID card copy function is then turned on in the Other Settings screen shown in FIG. 5, the evaluator module may make the evaluation in response to the ID card copy function being turned on. In this case, a configuration that adds to the Other Settings screen a shortcut operator to a screen (in this example, the basic settings screen) containing options for setting the output document as a result of determining a mismatch because the ID card copy function is on and the output document is A4 photographic paper is also conceivable.

In addition, the evaluator module may make the evaluation in response to the ID card copy function being turned on in the ID card copy settings screen shown in FIG. 6. In this case, a configuration that adds to the ID card copy settings screen in FIG. 7 a shortcut operator to a screen (in this example, the basic settings screen) containing options for setting the output document as a result of determining a mismatch because the ID card copy function is on and the output document is A4 photographic paper is also conceivable.

The adding module may add to the first settings screen a shortcut operator for calling a second settings screen containing a second setting item when a setting value the user set for a first setting item contained in a first settings screen does not match the setting value of the second setting item. For example, if there are two or more setting values equivalent to a second setting item that does not match the setting value of the first setting item, the adding module may add a shortcut operator to a second settings screen corresponding to two or more second setting items.

Furthermore, when the setting value of the second setting item that is already set does not match the setting value of the first setting item that was newly set, a shortcut operator to a dedicated second settings screen for setting the second setting item may be added to the first settings screen, and a shortcut operator to a dedicated settings screen for setting the first setting item may also be added to the first settings screen.

Furthermore, shortcut operators may be added to an area in the screen reserved for displaying shortcut operators, or near the first setting item. When a second setting item is included in the first settings screen, the shortcut operator may be added near the second setting item. Alternatively, a shortcut operator may be added near the start button (such as the start copying button) so that the user can easily see there is a conflict in the settings before commanding starting the final process (in the embodiments described above, making a copy) after changing settings.

Setting items other than the second setting item that does not match the setting value of the first setting item that was newly changed (specifically, setting items that match the setting value of the first setting item) may also be included in the second settings screen. In this case, so that the user does not need to scroll, the display area in the second settings screen may be controlled so the non-conforming second setting item is displayed at a location easily recognized by the user in the second settings screen when the shortcut operator is operated.

Note that the user may also be enabled to change the process that executes when the shortcut operator is operated. In the embodiments described above, a process of calling an associated screen is an example of a process executed when a shortcut operator is operated, but a configuration enabling the user to change the process that executes when a shortcut operator is operated so that, instead of executing a process of calling a screen associated with the setting item, a process of automatically changing the setting value of the associated setting item to resolve the mismatch is executed, is also possible.

The operation reception processor may be configured in various ways capable of calling a second settings screen from a first settings screen when operation of a first operator different from the shortcut operator is received and the setting value the user set for a first setting item contained in the first settings screen matches the setting value of a second setting item that is already set. More specifically, there must be at least a first operator that is enabled in the first settings screen when there is not a conflict between setting items. Therefore, when there is a conflict between setting items, the first operator does not need to be contained in the first settings screen in an enabled state. More specifically, the first operator contained in the first settings screen may be disabled, or the first operator may be omitted from the first settings screen.

Furthermore, when the second settings screen is not a dedicated settings screen for second setting items (when a setting item other than a second setting item is contained in the second settings screen), the first operator may function as an operator for directly calling the second settings screen from the first settings screen.

The operator is also not limited to touch operations, and various kinds of operations may be used. For example, dragging operations and gesture operations may be used, and operations using a mouse or a keyboard may be used.

When the second settings screen is displayed the first settings screen may be not shown, or only part of the first settings screen may be shown by overlaying the second settings screen on the first settings screen.

The process of the invention of adding a shortcut operator for calling a second settings screen containing a second setting item to the first settings screen when the value the user set for a first setting item contained in the first settings screen does not conform to the setting value of the second setting item that is already set, and calling the second settings screen from the first settings screen if operation of a first operator that is different from the shortcut operator is received when the setting values match, can also be applied as a program or a method.

The system, program, and method described above may be configured in many ways, and may include configurations embodied as a stand-alone device, and configurations embodied using parts of multiple devices. Various desirable adaptations, including configurations that are partially software and partially hardware, are also conceivable. The invention may also be embodied as a recording medium of a program that controls a system. The recording medium of the program may obviously also be a magnetic recording medium or semiconductor memory, or any other type of recording medium that may be developed in the future.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronic device comprising:
    an evaluator module configured to determine whether or not a setting value a user set for a first setting item contained in a first settings screen matches a setting value of a second setting item that is already set;
    an adding module configured to add to the first settings screen, while determining that the setting values do not match, a shortcut operator such that the shortcut operator is displayed in the first settings screen, the shortcut operator calling a second settings screen including the second setting item to display the second settings screen upon the shortcut operator being operated in the first settings screen, the second settings screen being different from the first settings screen; and
    an operation reception processor configured to call, while determining that the setting values match the second settings screen from the first settings screen upon a first operator that is different from the shortcut operator and is spaced apart from the shortcut operator being operated.

2. The electronic device described in claim 1, wherein:
    the second settings screen is a dedicated screen enabling setting the second setting item.

3. The electronic device described in claim 2, wherein:
    the first operator is an operator that calls the second settings screen by the user executing more steps than when the shortcut operator is operated from the first settings screen.

4. The electronic device described in claim 1, wherein:
    the adding module adds the shortcut operator in a first format that indicates a mismatch is not resolved when the setting value of the first setting item and the setting value of the second setting item do not match, and the setting value of the second setting item was not automatically changed to resolve the mismatch, and
    adds the shortcut operator in a second format that is different from the first format when the setting value of the first setting item and the setting value of the second setting item do not match, and the setting value of the second setting item was automatically changed to resolve the mismatch.

5. The electronic device described in claim 4, wherein:
    the adding module removes the shortcut operator in the first format from the first settings screen when a first condition is satisfied, and removes the shortcut operator in the second format from the first settings screen when a second condition is satisfied;
    the first condition and the second condition being different conditions.

6. A non-transitory computer-readable storage medium storing a display control program, the display control program causing a computer to function as:
    an evaluator module configured to determine whether or not a setting value a user set for a first setting item contained in a first settings screen matches a setting value of a second setting item that is already set;
    an adding module configured to add to the first settings screen, while determining that the setting values do not match, a shortcut operator such that the shortcut operator is displayed in the first settings screen, the shortcut operator calling a second settings screen including the second setting item to display the second settings screen upon the shortcut operator being operated in the first settings screen, the second settings screen being different from the first settings screen; and
    an operation reception processor configured to call, while determining that the setting values match, the second settings screen from the first settings screen upon a first operator that is different from the shortcut operator and is spaced apart from the shortcut operator being operated.

* * * * *